(12) United States Patent
Rama et al.

(10) Patent No.: US 8,656,365 B2
(45) Date of Patent: Feb. 18, 2014

(54) SYSTEMS, METHODS, AND COMPUTER-READABLE MEDIA FOR MEASURING QUALITY OF APPLICATION PROGRAMMING INTERFACES

(75) Inventors: Girish Maskeri Rama, Karnataka (IN); Basavara Raju Muddu, Karnataka (IN); Avinash Kak, West Lafayette (IN)

(73) Assignee: Infosys Limited, Bangalore, IN (US)

( * ) Notice: Subject to any disclaimer, the term of this patent is extended or adjusted under 35 U.S.C. 154(b) by 149 days.

(21) Appl. No.: 13/223,670

(22) Filed: Sep. 1, 2011

(65) Prior Publication Data

US 2013/0061211 A1 Mar. 7, 2013

(51) Int. Cl.
  *G06F 9/44* (2006.01)
(52) U.S. Cl.
  USPC ............................ 717/126; 717/127; 717/129
(58) Field of Classification Search
  USPC .................................................. 717/124–131
  See application file for complete search history.

(56) References Cited

U.S. PATENT DOCUMENTS

| | | | | |
|---|---|---|---|---|
| 6,539,339 B1 * | 3/2003 | Berry et al. | | 702/186 |
| 6,961,873 B2 * | 11/2005 | Dubovsky | | 714/38.13 |
| 7,010,598 B2 * | 3/2006 | Sitaraman et al. | | 709/224 |
| 7,100,151 B2 * | 8/2006 | Johnsen et al. | | 717/128 |
| 7,203,929 B1 * | 4/2007 | Vinodkrishnan et al. | | 717/124 |
| 7,490,319 B2 * | 2/2009 | Blackwell et al. | | 717/124 |
| 7,506,312 B1 * | 3/2009 | Girolami-Rose et al. | | 717/124 |
| 7,596,778 B2 * | 9/2009 | Kolawa et al. | | 717/126 |
| 7,725,576 B2 * | 5/2010 | Sitaraman et al. | | 709/224 |
| 7,890,806 B2 * | 2/2011 | Kwong et al. | | 717/124 |
| 7,984,429 B2 * | 7/2011 | Hunt | | 717/130 |
| 8,024,708 B2 * | 9/2011 | Demetriou et al. | | 717/124 |
| 8,074,204 B2 * | 12/2011 | Comstock et al. | | 717/125 |
| 8,356,282 B1 * | 1/2013 | Leippe et al. | | 717/125 |
| 8,365,147 B2 * | 1/2013 | Grechanik et al. | | 717/124 |
| 8,495,585 B2 * | 7/2013 | Miller | | 717/127 |
| 8,543,986 B2 * | 9/2013 | Murthy et al. | | 717/126 |

OTHER PUBLICATIONS

Wassermann et al, "Dynamic Test Input Generation for Web Applications", ACM, pp. 249-259, 2008.*
Gerlich et al, "Random Testing: From the Classical Approach to a Global View and Full Test Automation", ACM, pp. 30-37, 2007.*
Seo et al, "Automating Embedded Software Testing on an Emulated Target Board", IEEE, pp. 1-7, 2007.*
Jensen et al, "Automated Testing with Targeted Event Sequence Generation", ACM, pp. 67-77, 2013.*
J. Stylos and S. Clarke, "Usability Implications of Requiring Parameters in Objects' Constructors," in Proceedings of the 29th international conference on Software Engineering. IEEE Computer Society Washington, DC, USA, 2007, pp. 529-539.

(Continued)

*Primary Examiner* — Anil Khatri
(74) *Attorney, Agent, or Firm* — Marc S. Kaufman; Stephen M. Hertzler; Reed Smith LLP

(57) ABSTRACT

A system, computer-implemented method, and computer-readable medium for determining the quality of an API includes receiving documentation of the API, determining one or more characteristics of the API based at least in part on the documentation of the API, determining or more measurement values based at least in part on the one or more characteristics of the API, and computing a quality score for the API based at least in part on the one or more measurement values.

20 Claims, 11 Drawing Sheets

(56) References Cited

OTHER PUBLICATIONS

B. Ellis, J. Stylos, and B. Myers, "The factory pattern in api design: A usability evaluation," in Proceedings of the 29th international conference on Software Engineering. IEEE Computer Society Washington, DC, USA, 2007, pp. 302-312.

S. Clarke, "Measuring API usability," Doctor Dobbs Journal, vol. 29, No. 5, pp. 1-5, 2004.

J. Beaton, S. Jeong, Y. Xie, J. Stylos, and B. Myers, "Usability Challenges for Enterprise Service-Oriented Architecture APIs," in 2008 IEEE Symposium on Visual Languages and Human-Centric Computing, VL/HCC08, pp. 15-18.

J. Stylos and B. Myers, "Mapping the Space of API Design Decisions," in IEEE Symposium on Visual Languages and Human-Centric Computing, 2007. VL/HCC 2007, pp. 50-60.

J. Stylos, S. Clarke, and B. Myers, "Comparing API Design Choices with Usability Studies: A Case Study and Future Directions," Psychology of Programming Interest Group, 2006.

B. Abrams, "Should you change return types in a method overload?" http://blogs.msdn.com/brada/archive/2005/07/16/439692.aspx, Jul. 2005.

K. Cwalina, "General API Design," Online weblog. http://blogs.msdn.com/kcwalina.

M. Henning, "API design matters," ACM Queue, vol. 5, No. 4, pp. 24-36, May 2007.

J. Blanchette, "The Little Manual of API Design," http://www4.in.tum.de/blanchet/api-design.pdf, Jun. 2008.

Stack Overflow Mailing List, "How many parameters are too many?" http://stackoverflow.com/questions/174968/howmany-parameters-are-too-many, May 2008.

M. Fowler, "Too many parameters," http://c2.com/cgi/wiki?TooManyParameters.

J. Luehe, "Changes to Servlet and Filter Registration APIs in Servlet 3.0," Blog Article, http://blogs.sun.com/jluehe/entry/changes_to_servlet_and_filter, Dec. 2008.

C. Barham, "Liferay bug Ips-2908 : Localserviceutil static methods have too many complex parameters—replace with builder pattern," http://issues.liferay.com/browse/LPS-2908, Apr. 2009.

J. Bloch, "How to design a good API and why it matters," in ACM Symposium on Object-oriented Programming: Systems, Languages and Applications (OOPSLA'06), Oct. 2006.

Osdir.com Mailing List Archive, "Confusing API—HtmlForm," http://osdir.com/ml/java.htmlunit.devel/2004-12/msg00027.html.

B. Goetz, "Java Theory and Practice: I have to document That?" IBM DeveloperWorks, Aug. 2002.

Sun Developer Network Bug Database, "Format classes are not thread-safe, and not documented as such," Bug id 4264153, http://bugs.sun.com/bugdatabase/view_bug.do?bug_id=4264153, Aug. 1999.

Apache Commons Bug Database, "FastDateFormat Thread Safety," Bug id LANG-367, http://issues.apache.org/jira/browse/LANG-367, Oct. 2007.

S. Fleiter, "Spring framework:thread-safety and visibility issues not documented," http://jira.springframework.org/browse/SPR-4307, Jan. 2008.

Sun Java Forum, "Swing-JTextArea, DocumentListener, and thread-safety," http://forums.sun.com/thread.jspa?threadID=5424219&tstart=0, Jan. 2010.

S. Microsystems, "Learning the java language—overloading methods," http://java.sun.com/docs/books/tutorial/java/javaOO/methods.html, Feb. 2008.

N. Cowan, "The magical No. 4 in short-term memory: A reconsideration of mental storage capacity," Behavioral and Brain Sciences, vol. 24, No. 01, pp. 87-114, 2001.

M. Conway, S. Audia, T. Burnette, D. Cosgrove, and K. Christiansen, "Alice: lessons learned from building a 3D system for novices," in Proceedings of the SIGHCHI conference on Human factors in computing systems. ACM New York, NY, USA, 2000, pp. 486-493.

P. Louridas, D. Spinellis, and V. Vlachos, "Power laws in software," ACM Trans. Softw. Eng. Methodol., vol. 18, No. 1, pp. 1-26, 2008.

Stackoverflow Mailing List, "Multi-threading and Java Swing Problem," http://stackoverflow.com/questions/720244/multithreading-and-java-swing-problem.

A. S. Lee and R. L. Baskerville, "Generalizing generalizability in information systems research," Information Systems Research, vol. 14, No. 3, pp. 221-243, 2003.

T. D. Cook, W. Shadish, and D. Campbell, Experimental and Quasi-Experimental Designs for Generalized Causal Inference. Houghton Mifflin, 2002.

* cited by examiner

SYSTEMS, METHODS, AND COMPUTER-READABLE MEDIA FOR MEASURING QUALITY OF APPLICATION PROGRAMMING INTERFACES

BACKGROUND

In software engineering, gone are the days when software was usually built from scratch and worked in insolated environments. Open platforms and open systems have become the norm. Interoperability has become the mantra and systems are expected to expose Application Programming Interfaces ("APIs") such that they can be used in various contexts by multiple client applications. Moreover, modern software is generally built by assembling various software packages (e.g., libraries, modules, etc.) that may be developed by third parties. This may be especially true in the context of service oriented software. Software may be created principally in the form of modules, with each module characterized by its API. This module based development is exacerbated by the current trend of globally distributed software development.

At its most general, an API can be thought of as a focused representation of the overall functionality of a software module. The representation is focused in the sense that the functionality declared in the API provides a specific set of services for a certain target usage. It would not be uncommon for the same module to have multiple APIs, each intended for a specific use of that module. For the purposes of this disclosure, an API may be whatever the designer of a software module has specified it to be, without any judgment regarding what functionality the API offers. In other words, an API of a system may be a set of methods that are listed in the API documentation for the system.

For example, an interest-calculation module in a financial software system may contain multiple user-directed APIs. There could be an API designed specifically for regular banking applications, another for co-op banking applications, yet another for banking-like financial services provided by mutual-fund operators, and so on. While the basics of interest calculations for all these related applications are likely to be the same, different uses of the software may entail using a method name vocabulary particular to that application. In addition to vocabulary differences, the different APIs for the same module may also differ with regard to the functionality offered.

The central role played by the APIs in modern software engineering makes it all the more important that, to the maximum extent possible, they be easy to comprehend. Ideally, the users of a module/library need look no further than its API. That is, ideally there should never be a reason to examine the implementation code in a module itself. Unfortunately, the quality of APIs varies significantly. Often a user must carefully study example code, when it is even supplied, before they can figure out how and when to use an API method. Additionally, example code may be poorly written and poorly documented, which may increase the user's level of frustration with an API. As one might expect, such frustrations often translate into reduced productivity when it comes to writing code using such APIs. APIs that are hard to understand, remember, and use are more prone to misuse and may inadvertently introduce subtle, hard to debug bugs in a system. More importantly, low quality APIs discourage reuse of software.

While systems, methods, and computer-readable media are described herein by way of examples and embodiments, those skilled in the art recognize that measuring quality of APIs is not limited to the embodiments or drawings described. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

As described in the background, it is widely accepted that APIs play a vital role in software development where software is developed by assembling plural software modules and libraries. Developers depend on APIs and their documentation for understanding how and when to use the API methods of a module or library. Given this importance, it may be useful to gauge the quality of an API. However, currently no tools exist for quantitatively measuring the quality of an API. In contrast, those in the business of designing libraries and large systems curently manually examine APIs to get a qualitative feel for the quality of the APIs. The trend in the area has been to lay down generic guidelines for good API design. Given two APIs today, the best one can do to compare the quality of each of the two is to provide subjective judgments based on manual examination. Moreover, in an API with hundreds of API methods, discerning which of these are inconsistent, discerning which of these should have been grouped together, and performing similar analysis is difficult to do manually.

Embodiments disclose methods, systems, and computer-readable media that may quantitatively measure the quality of an API. Embodiments may measure and evaluate the quality of an API from various perspectives according to plural metrics. Embodiments may diagnose flaws in an API and pinpoint structural defects. As used herein, quality of an API may be limited to the structural properties of the method declarations of the API. Structural properties may be, for example, properties of parameter lists, runs of parameters of the same data type, consistency in the data types returned by methods with similar names, consistent grouping of methods of similar functionality, and the like. While an API must obviously function correctly, must be memory efficient, must be secure, and the like to be useful, quality of an API as used herein addresses only the usability and structure of an API. In other words, quality as used in this disclosure may not encompass functional correctness, completeness, memory management, and similar performance-related issues involved in using a set of method declarations in an API.

Figure 1:
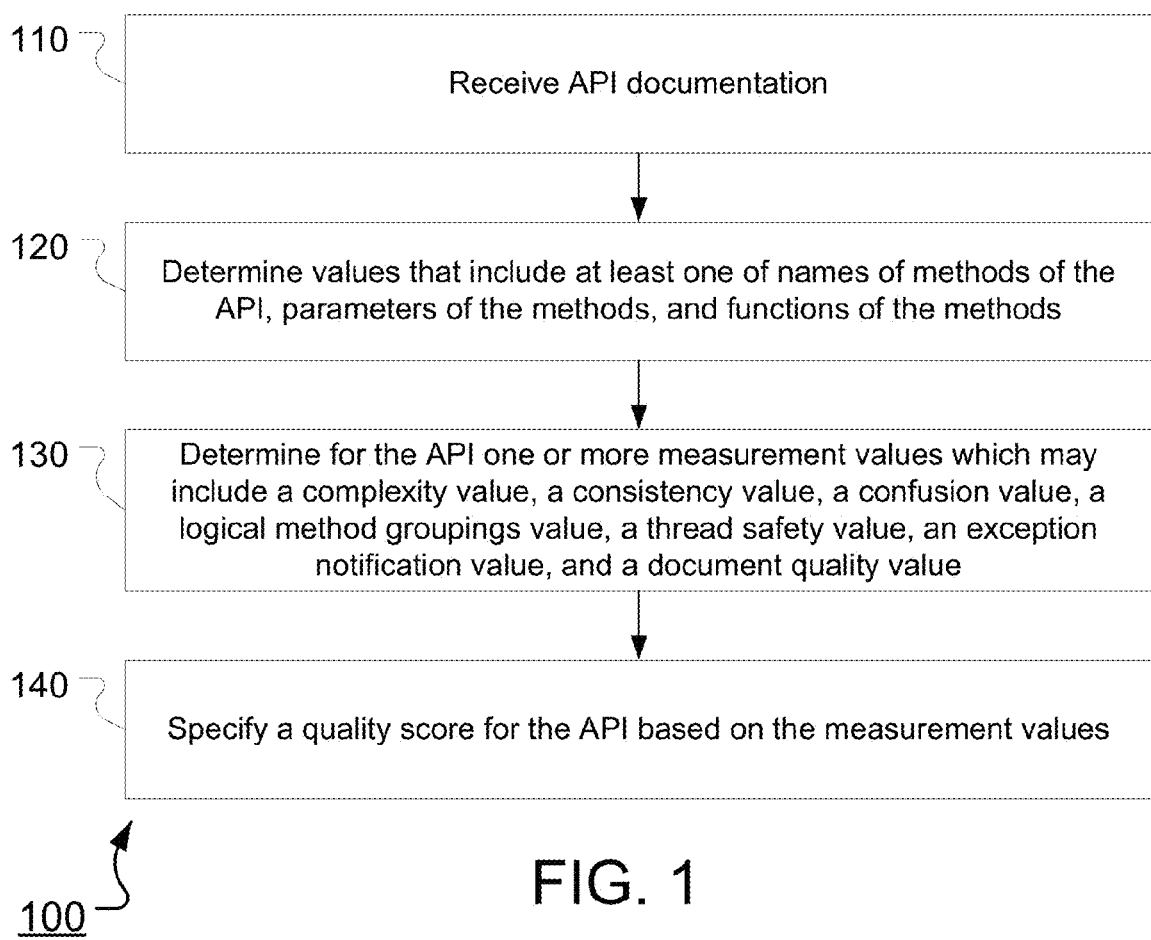
FIG. 1 shows an exemplary process flow for a computer-implemented method of measuring the quality of an API.

FIG. 1 shows an exemplary process flow 100 for a computer-implemented method of measuring the quality of an API. At step 110, one or more computing devices may receive documentation of an API. The documentation may include, for example, a listing of methods in the API, parameters for the methods, data types of the methods, behavior of the methods, and the like. While different APIs may provide digital documentation of the respective API in various fashions, step 110 may generally involve receiving documentation of an API independent of the format of the API documentation and independent of the fashion in which the API documentation is transmitted to the one or more computing devices.

At step 120, one or more computing devices may determine, based on the API documentation, values that indicate at least one of names of methods of the API, parameters of the methods of the API, functions of methods of the API, and the like. At step 130, one or more computing device may determine one or more measurement values. The measurement values may include a complexity of the API, a consistency of the parameters of the API, a level of confusion of the API, a logical grouping of methods of the API, a thread-safety characteristic of the API, an exception notification characteristic of the API, and a documentation quality of the API. At step 140, one or more computing devices may specify a quality score of the API based on the one or more measurement values.

Process flow 100 may be useful for identifying characteristics of method declarations in an API that may be considered to be sources of frustration for client programmers who whish to interact with the API. These sources of frustration include having methods with similar names returning different types of values, methods with parameter lists containing runs of the same type, methods with long parameter lists, methods with similar looking parameters but inconsistent sequencing of parameter names, numerous methods with nearly identical names, conceptually similar methods grouped separately, methods devoid of a thread-safe indicator, methods using exception throwing classes that are too general with respect to error conditions that result in the respective exceptions, and methods having poor quality API documentation. The following description addresses how process flow 100 may be useful for pinpointing sources of frustration with the API and for specifying a quality score for the API.

As mentioned earlier, a common source of frustration for client programmers using an API is method name overloading. Method name overloading, often more simply referred to as "method overloading" or "function overloading," is a feature common to most object-oriented languages. This allows for the use the same method name for different purposes. That is, a single API may contain multiple methods with the same name but with different types and/or numbers of parameters. These methods may be locally defined or inherited.

When the overloaded methods return different types, a client programmer using the method must remember the associations between the return types and the method signatures for the different overloadings. For example consider the following two methods defined for the class javax.naming.directory.Attribute in Java 5™.

void add(int ix, Object attrVal)
boolean add(Object attrVal)

The first method add( ) assumes an ordered list of attribute values; this method inserts the attribute value supplied through the second argument at the location specified by the first argument. On the other hand, the second method is based on the assumption that the attribute values are unordered and it appends the attribute value supplied through the only argument at the end of the attribute list. While the first add( ) returns void, the second returns a Boolean value. One can easily imagine how these methods would be a source of confusion for both a client programmer and for someone trying to understand the code in which one or both of these methods is used. Depending on the compiler used, the discrepancy in the return value could even become a source of a hidden bug.

Indeed, the Sun Java™ tutorial on method overloading warns about excessive and inappropriate use of overloading which can make the API code less readable and usable. As the above example illustrates, this is especially the case if different overload definitions have different return types. Of course, there are a few valid exceptions to this guideline. For instance, to emulate generics in languages that do not support it there may exist overloaded methods with different return types. However, this is not a commonly used case of method overloading and in most cases the guideline is applicable.

In some embodiments, step 130 of process flow 100 may include determining the extent to which the different overload definitions for the same method name do not return the same type (i.e., determining a method name overload index ("AMNOI") metric). In such a step 130, a computing device may let all the overloaded API methods in a given API be partitioned into N disjoint sets.

$$G_j = \{G_1, G_2, \ldots G_N\}$$

where $G_j$ is the set of overloaded API methods having the same name. Name(m) and Returns(m) may be functions that return the name and return type, respectively, for a given method m. The set of all methods in the API may be represented by M.

$$G_j = \{m \in M | \forall m_1, m_2 \in G_j \cdot \text{Name}(m_1) = \text{Name}(m_2)\}$$

An API Method Name Overload Index metric for a given overloaded API method set $G_j(\text{AMNOI}_{G_j})$ may be defined in the following manner:

$$\text{ANMNOI}_{G_j} = 1 - \frac{|\{\text{Returns}(m) \mid m \in G_j\}| - 1}{|G_j| - 1}$$

In the above equation, the set membership discipline ensures that, when Returns(m) is the same for more than one m, there is only one entry in the set {Returns(m)} for all of those m. Therefore, the cardinality of the set {Returns(m)} must equal the total number of distinct return types for the methods in the set $G_j$. One may be subtracted from both the numerator and denominator to bound the metric value between zero and one. In the best case, all of the overloaded methods have the same return type, which would cause the numerator to become zero and the AMNOI metric value for $G_j$ to become one. In the worst case where each of the overloaded methods has a different return type, the numerator may be equal to the denominator and the value of the AMNOI for $G_j$ may become zero.

AMNOI for the API may be defined as:

$$AMNOI = \frac{\sum_{j=1}^{j=N} AMNOI_{G_j}}{N}$$

This metric measures the usability of an API with regard to the structural overloading issue described above.

Another common source of frustration for client programmers include method declarations in an API that contain several parameters of the same type. It is more difficult for a client programmer to remember which argument goes with what parameter in such cases. For illustration, consider the following method declaration for the class TPASupplierOrderXDE in Petstore.

void setShippingAddress(String firstName, String lastName, String street, String city, String state, String country, String zipCode, String email, String phone)

This method has a sequence of nine parameters, all of which are of the same type, namely "string". A client programmer using this method may inadvertently pass a value to the first parameter that was meant for the second parameter, or vice versa. For obvious reasons, a longer sequence of parameters of the same type exacerbates this problem. A client programmer trying to use this method would likely need to repeatedly look at the documentation so as to pass the right values to each of the parameters.

Similarly, unreasonably long parameter lists tend to cause frustration and confusion. The following method in "Liferay," which is an open-source enterprise portal, exemplifies a method likely to cause frustration for this reason:

static JournalArticle addArticle(long userId, long groupID, java, lang, String articleId, boolean autoArticleId, double version, java, lang, String title, java, lang, String description, java, lang, String content, java, lang, String type, java, lang, String structureId, java, lang, String templateId, int displayDateMonth, int displayDateDay, int displayDateYear, int displayDateHour, int displayDateMinute, int expirationDateMonth, int expirationDateDay, int expirationDateYear, int expirationDateHour, int expirationDateMinute, boolean neverExpire, int reviewDateMonth, int reviewDateDay, int reviewDateYear, int reviewDateHour, int reviewDateMinute, boolean neverReview, boolean indexable, boolean smallImage, java, lang, String, byte [ ]> images, java, lang, String articleURL, javax, portlet, PorletPreferences preferences, java, lang, String[ ]tagsCategories, java, lang, String[ ] tagsEntries, boolean addCommunityPermissions, boolean addGuestPermissions)

In contrast to these exemplary methods having sequences of parameters of the same type or unreasonably long parameter lists, API method declarations that involve only a small number of parameters that are "well-ordered" are easier to understand, remember, and use.

Embodiments may determine an API Parameter List Complexity Index ("APXI") metric in step 130 that measures the overall usability of an API with respect to the lengths of parameter sequences and the extent to which parameters occur in runs of data objects of the same type. The APXI metric may contain two components, one for analyzing the method declarations for the lengths of the parameter sequences and another for analyzing the method declarations for variations in the parameter types.

In such embodiments, $A(m) = \{a_1, a_2, \ldots, a_N\}$ may represent the sequence of parameters in a given method declaration m. The notation $C_l$ may be used to measure the relative quality, averaged over all of the API methods, of the lengths of the parameter sequences in the individual methods. $C_l$ may be calculated by:

$$C_l = \frac{1}{|M|}\sum_m g(N_d, |A(m)|)$$

with g( ) given by:

$$g(x, y) = \begin{cases} e^{x-y} & \text{if } y \leq x \\ 1 & \text{otherwise} \end{cases}$$

In the formula for $C_l$, $N_d$ may be the desired best choice for the number of parameters in a method. As mentioned earlier in this section, a value of four or five may be what most seasoned developers would recommend for $N_d$ (i.e., a list of parameters greater than four or five may be an unreasonably long parameter list). However, any value may be selected for $N_d$. $C_l$ may be referred to as the parameter length complexity of an API.

In such embodiments T(a) may represent the type of a given parameter a. $S_{pt}(m)$ may be the set of the parameters in the method declaration m when the next parameter in the parameter list is of the same type. The following expression can be written for $S_{pt}(m)$:

$$S_{pt}(m) = \{a_i \in A(m) | a_j \in A(m) \wedge j = i+1 \wedge T(a_i) = T(a_j)\}$$

The notation $C_s$ may be used to represent the extent, averaged over all the methods, to which the parameter types do not stay the same for consecutive runs of the parameter types in a parameter list. In terms of $S_{pt}$, $C_s$ may be given by:

$$Cs = \frac{1}{M}\sum_m \left\{1 - \frac{|S_{pt}(m)|}{|A(m)| - 1}\right\}$$

where $C_s$ refers to the parameter sequence complexity of an API. Finally, the APXI for the API may be defined as the average of $C_l$ and $C_s$:

$$APXI = \frac{C_l + C_s}{2}$$

The APXI value may be bounded between zero and one. The APXI value is likely to be lower the longer the lengths of the parameter lists in an API. When parameter lists become long it becomes more likely that such lists will contain multiple runs of parameters of the same type.

Structural consistency facilitates API usability. API documents that are inconsistent in the sense that the methods with similar functionality have their parameters (that may take arguments that are similar or identical) arranged inconsistently create frustration and confusion.

By way of example, consider the API for the class javax.xml.stream. XMLStreamWriter in Java 1.5™. This API lists a number of methods such as writeStartElement, write- EmptyElement, and writeAttribute for writing extensible markup language ("XML") to an output stream. The parameter lists for all these methods include the local name of the XML element to be written out (formal parameter name being localName) and the namespace universal resource identifier ("URI") (formal parameter name being namespaceURI). One would expect that the order in which the two parameter names show up in the method declarations would be consistent across the methods that do more or less similar things. That is, one would either want to see namespaceURI before local-Name in all such method declarations in the API or vice versa. That is unfortunately not the case. The API declarations for the methods writeStartElement and writeAttribute list the parameter namespaceURI before the parameter localName, whereas the declaration for the method writeEmptyElement lists these two parameters in the opposite order. This is a recipe for trouble because it may cause a client programmer to inadvertently call the method writeEmptyElement while passing the namespaceURI before localName. Of particular importance, because both of these parameters are of type String, the code with writeEmptyElement called incorrectly likely still compiles without problems. The code would even run without problems as long as the method writeEmptyElement is not actually invoked at runtime. But if this method should get called at runtime, a client programmer can only guess as to what the outcome will be, ranging from program misbehavior to the program crashing. Inconsistencies in the sequencing of similar parameters in the method signatures may also sow doubt in the mind of a client programmer at the time of writing code as to whether he/she truly remembers the correct method signature for a given method call.

Embodiments may determine an API Parameter List Consistency Index ("APLCI") metric in step 130 that quantitatively measures the parameter list consistency of methods of an API. In embodiments, P may be the set of all parameter names used in all the methods of an API. M may be the set of all API methods. A set of methods may be considered to be of related functionality if the methods in the set share at least two parameter name labels. $P_m$ may denote the ordered set of parameter names for a method m. For every pair of parameter names $p_i$, $p_j \in P$, $M_{p_i p_j}$ may be the set of all methods whose parameter lists contain the parameter names $p_i$ and $p_j$ in any order. That is, $$M_{p_i p_j} = \{m \in M | p_i \in P_m \wedge p_j \in P_m\}$$

For a given pair of parameter name labels $p_i$ and $p_j$ from the set P, the set $M_{p_i p_j}$ may be empty. The set $M_{p_i p_j}$ may additionally be partitioned into two disjoint subsets:

$$M_{p_i p_j} = M_{p_i : p_j} \cup M_{p_j : p_i}$$

where $M_{p_i : p_j}$ is the subset in which the parameter name $p_i$ appears before $p_j$ and $M_{p_j : p_i}$ the subset where the order of the two names is reversed. For the set $M_{p_i p_j}$ of methods to be considered consistent with regard to the listing of the parameters, the cardinality of the set must be at least two and one of the two subsets $M_{p_i : p_j}$ and $M_{p_j : p_i}$ must be empty. Otherwise, the set $M_{p_i p_j}$ may be considered to be inconsistent.

According to embodiments, the APLCI metric for an API may be defined as the ratio of number of consistent method sets to the total number of such sets that are allowed to be tested for consistency:

$$APLCI = \frac{|\{M_{p_i, p_j} | \forall_{p_i, p_j} | \geq 2 \wedge M_{p_i p_j} \text{ is consistent}\}|}{|\{M_{p_i, p_j} | \forall_{p_i, p_j} | \geq 2\}|}$$

The value of APLCI may be bounded between zero and one. If all the subsets of the API methods that have at least two common parameter names are consistent, the APLCI value may equal one. Conversely if all such subsets are inconsistent, the value may equal zero.

As mentioned above, structural consistency adds to API usability and quality. However, APIs that have evolved through multiple version changes commonly contain similar API method names whose functionalities are more or less the same. Programmers are often frustrated when there is a need to invoke such methods since they must frequently refer to other sources to ascertain the subtle differences between the behaviors associated with such method names. The following three abuse patterns illustrate potential confusion arising from the structural inconsistency of API method names.

First, consider an I/O module designed for an embedded application. For example, the API for the module may list the following method for writing an array of bytes to the flash memory of the module:

*int* writeByteArray(byte[ ] byte *arr*)

Assuming that the execution speed is critical because of real-time constraints on the application, the writers of the module may forgo any checks on the availability of the needed memory before the above method is invoked at run time. Such a check may not really be necessary for the embedded device for which the software is originally written, for example, on account of how the memory may be made available to the application. Subsequently another client may express interest in the same library but for a different embedded application for which the memory-management assumptions made at the time the software was first written do not hold. The new client may want the writers of the software to either alter the implementation of the above method or to provide another similar method whose overall functionality is the same but that includes certain checks on the available memory. For business reasons the supplier of the software library may not want to create two separate modules for these two clients. Thus, the writers of the software may be left with no choice but to expand the API with another version of the writeByteArray( )method that may be "conveniently" named as:

int writeByteArray2(byte[ ] byte arr)

The may create obvious confusion for future client programmers who may use the API. The API would now include two method declarations with names that are more or less identical with the two methods offering the same functionality. While a careful reading of the associated documentation may, in most cases, clarify the role played by each method, the potential for such an API to lead to coding errors is high. Calling the first version of writeByteArray( ) when the second one is actually needed could result in a run-time abort of the application under certain data conditions, and calling the second version when it was the first one that was really needed could unnecessarily slow down an application.

By way of alternative example, take the case of Xalan-Java™, an extensible stylesheet language transformation ("XSLT") processor for transforming XML documents into HTML, text, and other XML document types. The API of the class PrintTraceListener in the package org.apache.xalan.trace of this software library includes two method declarations with names_trace( ) and trace( ) the difference between the two being merely the prefix '_' for one of the names. The API documentation does not indicate anything about the difference in the functionality offered by these two methods. The users of this API have no choice but to look at the source code in order to figure out as to which of the two methods to call. And, as it turns out in this case, both these methods are functionally equivalent, with one merely redirecting to the other. Such duplicate names may cause a programmer confusion and frustration.

As a further example, consider the case when there exists two or more method names in an API that differ only with regard to the case used for some of the characters. When API method names differ only with regard to the capitalizations, those method names are confusing and frustrating to use. For instance, the API of the class javax.xml.datatype.XMLGregorianCalendar in Java 2™ includes two methods that are named getTimeZone( ) and getTimezone( ). Except for the fact that the character 'z' appears uppercase in one and lowercase in the other, the two names are identical. What is particularly troublesome here is that a programmer may completely overlook the difference in the method names in a quick perusal of the API because the two names appear to be very nearly the same to the human eye. In such a case, a programmer is just as likely to use the right method as the wrong one when wanting the functionality offered by either of the two methods named here.

The three abuse patterns described above demonstrate that a metric may be helpful that gives a quantitative assessment of the usability of an API with regard to its potential to confuse the programmers because some of the method names used in the API are too similar. However, such a metric must account for the practice of method name overloading in object-oriented programming. Method name overloading allows a programmer to equip a class with different versions of the same method called (e.g., print( ) with each version meant for a different type of argument, with the method overload resolution algorithm of the compiler deciding which specific executable to invoke for a given method call. When method names are overloaded, the different versions of the method will possess different signatures (i.e., the name of the method followed by an ordered list of the parameter types in the parameter list of the method). Since method name overloading serves an important purpose in object-oriented programming, measuring method name similarities that could confuse clients may expressly discount those similarities that are a result of method name overloading.

In some embodiments, step 130 of process flow 100 may include determining an API Method Name Confusion Index ("AMNCI") metric. The AMNCI may measure the usability of an API from the standpoint of the three name-abuse patterns disclosed above while accounting for the similarity of the names that can be attributed to method name overloading.

The AMNCI metric may be based on the notion of a canonical form for a method name. A set of API methods may be considered confusing if the canonical form of the method names is exactly the same with the caveat that such a set does not include the overloaded versions of the same method name. This caveat is implemented by limiting each method name (as it appears in the API method declaration as opposed to a canonical form of the method name) to appearing only once in the set.

The canonical form may be acquired by erasing or modifying certain characters that may correspond to the three above-described abuse patterns. Exemplary character erasure rules are illustrated by the search and replace regular expressions shown below:

| | |
|---|---|
| $MethodNameString = ~ s/\d*$// ; | #(remove numerical suffix ) |
| $MethodNameString = ~ s/_// ; | #(remove `_`) |
| $MethodNameString = ~ tr/[a-z]/[A-Z]/ ; | #(Convert to UpperCase ) |

While these exemplary regular expressions are illustrated in Pearl syntax, a regular-expression engine used in most major object-oriented programming platforms, alternative syntaxes or expressions may be used.

In these exemplary regular expressions, using Perl's s/// syntax, the first statement indicates that the canonical form of a method name stored in the variable $MethodNameString may be obtained by erasing any numeric suffixes sticking to the end of the string. The s/// operator will cause the string value of $MethodNameString to be replaced by its canonical form. Similarly, the second statement indicates that the canonical form of a method name may be obtained by erasing all occurrences of an underscore. Finally, the third statement tells us that the canonical form of a method name may be obtained by converting all characters into their uppercase forms.

Of course, these canonical form rules are exemplary only and any others may be used. For example, in addition to, or as an alternative to, removing an underscore, other special characters (e.g., hyphens, periods, etc.) may be removed. By way of further examples, numerical characters appended to a method name may be removed, the letters of a name string may be converted to lowercase, and so on.

In embodiments, m may denote the name of a method as listed in the API and CF(m) may be the name's canonical form as obtained by the application of one or more canonical form rules, such as the three character-erasure rules shown above. M may be the set of all method names listed in the API. The set membership discipline may guarantee that all overloaded versions of the same method name will make only one appearance in the set. $M_{erasure}$ may be a list of method names obtained after the canonical form rules are applied to each member of the set M. C, defined below, may thus denote the list of confusing method names in the API. An API method named may be considered confusing, and therefore placed in the list C, if there exist two or more members of the set M that yield different identical canonical forms in the list C. That is:

$$C=\{m_1 \in M | \exists m_2 \in M \cdot CF(m_1)=CF(m_2)\}$$

The AMNCI for a given API may thus be defined as:

$$AMNCI = 1 - \frac{|C|}{|M|}$$

where |.| denotes the cardinality of the argument set. The value of AMNCI may be bounded between zero and one. If every method name determined to be confusing vis-à-vis some other method name, then C may be the same as M and the value of AMNCI may be determined to equal zero. On the other hand, when all of the method names are distinctly different and no two have the same canonical form, the set C may be empty and the value of AMNCI may be determined to equal one.

In alternative embodiments, the AMNCI metric may be determined in other ways. For example, the AMNCI metric may alternatively be based on the Levenstein edit distance that can be used to measure the extent of dissimilarity between two strings. However, such embodiments may results in greater false positives. For example, the method names getMinLabel( ) and setMinLabel( ) may be identified as confusing. While the two names differ in only one character position, most programmers likely would not consider them to be confusing.

Structural quality of an API may further be reduced if conceptually and/or functionally similar API methods are not grouped together. Given a small API containing, for example, approximately one dozen methods, it may be relatively easy for a programmer to commit to memory all of the methods and what each method does. However, that would cease to be the case as the size of an API increases.

It is common for a programmer to be looking for an API method with a particular functionality and, for example, the API may contain several methods with related functionality that happen to be listed together somewhere at the beginning of the API document. However, the perfect method may be listed all by itself somewhere near the end. In such a case, it would not at all be unusual for the programmer to miss the method that would be a perfect match for what the programmer wants. After quickly scanning through the related methods at the beginning of the API document, the programmer would likely assume that they had checked all of those kinds of methods in the API.

Also, confronted with a large API, the programmer must consult the documentation frequently to determine whether or not the API offers a particular functionality and how to invoke the method that implements that functionality. As the programmer uses methods from the API, the programmer will gradually form a mental landscape of how the API is organized with regard to the packaging of the services it offers. So when most of the methods offering a certain kind of functionality are grouped together and the rest of the methods offering the same kind of functionality tucked away elsewhere; the latter may get overlooked.

As a case in point, shown below is the order in which the methods are declared in the API of the class HtmlForm of the HtmlUnit application (a GUI-less browser for Java programs):

*getInputByName( )*

*getInputByValue( )*

*getInputsByValue( )*

⋮

*getAllInputsByName( )*

While getInputByName( ) appears at the very beginning of the API document, the closely related getAllInputsByName( ) appears at the very end. This creates the possibility that a programmer needing the functionality of getAllInputsByName( ) may assume its absence in the API after seeing the ByName to ByValue change in the method listings. Subsequently, the programmer could try to create his/her own implementation for what he/she needs by making iterative invocations of the getInputByName( )method. Hence, when methods of similar names and similar functionality are scattered all over in a large API, it can seriously impinge on the usefulness of the API.

In some embodiments, step 130 of process flow 100 may include determining an API Method Grouping Index ("AMGI") metric. The AMGI may measure the extent to which an API groups conceptually related method declarations together. To develop this metric, a computing device may infer the semantic relationships between method declarations on the basis of the semantically significant keywords extracted from the method names used in the declarations. Methods whose names contain the same keyword(s) may be considered to be semantically related. For example, the string "phone" may be a semantically significant keyword in plural method names and therefore a computing device may consider the declarations for the methods getPhoneNumbers( ), setPhoneNumbers( ), addPhoneNumber( ), and removePhoneNumber( ) to be semantically related.

The following steps may be used for extracting the semantically significant keywords from a set of method names. First, a computing device may remove commonly occurring prefixes and suffixes from the names of the methods in the API. For example, 'get', 'set', and the like may be removed. Next, what remains of the method names may be split into plural substrings on the basis of commonly occurring connectors. Commonly occurring connectors may be, for example, "_", '—', 'by', 'of', 'and', 'to', etc. and case changes as in 'CamelCase'. Finally, a computing device may determine if the total number of occurrences of a given name fragment in the set of name fragments returned by the previous step exceeds a threshold θ and, if so, consider that name fragment as a significant keyword. The threshold may be, for example, predetermined or manually set. Of course, these steps are exemplary only and additional or different steps may be performed to extract semantically significant keywords from a set of method names.

$S=\{s_j | i=1 \ldots N\}$ may be the set of significant keywords obtained as described above for a given API. For each keyword $s_j$, a computing device may substring-match the keyword sequentially with all the method names in the API in the order in which the methods are declared. A successful match with one or more API methods may be considered as a 'run'. A sequence of run-lengths may be constructed where each run-length value is the number of times a substring match between consecutively occurring method declarations and the keyword occurs. The notation $L(s_j)=(r_i | i \ldots R_j)$ to represent the sequence of non-zero run-lengths, where $R_j$ is the number of such runs for the keyword $s_j$.

To clarify with an example, suppose the keyword $s_j$ is "phone". As a computing device substring-matches this keyword with every method name in the API, a run of four method names occurring consecutively that all contain the keyword "phone" may be determined. Subsequently, another run of three methods that also contain the same keyword may be determined. Finally, there yet another run of five method declarations that also contain "phone" in the method names may be determined. In this case, L("phone")=(4, 3, 5) and $R_j=3$.

The notation $r_i$ may represent the $i^{th}$ run-length value in $L(s_j)$. The total number of method declarations which match the keyword $s_j$ may be represented by O. Since each run captures the consecutively occurring method declarations that match the keyword, the sum of the run lengths yields the total number of matching method declarations as specified below.

$$O(s_j) = \sum_{i=1}^{i=R_j} r_i$$

The notation AMGI($s_j$) may represent the API method name grouping index for a given keyword $s_j$ and may be defined as follows:

$$AMGI(s_j) = 1 - \frac{R_j - 1}{O(s_j) - 1}$$

For a given keyword $s_j$, the value of AMGI($s_j$) may equal one when all of the method declarations whose names contain the keyword exist in a single run in the API as this would be considered to be ideal with regard to method grouping. In this case, the value of $R_j$ may equal one. At the other extreme, if the method declarations that contain a given keyword are all completely scattered, all of the elements $r_j$ in the sequence L($s_j$) may equal one and the value of $R_j$ may be the same as that of O($s_j$). Thus, the value of AMGI($s_j$) may be zero in this case.

The AMGI metric for a given API may be defined as the average of AMGI($s_j$) values for all the keywords in the set S as shown in the following equation:

$$AMGI = \frac{\sum_{j=1}^{N} AMGI(s_j)}{N}$$

The API-level metric AMGI may retain the normalization associated with the keyword-specific metric AMGI($s_j$).

Given the growing importance of multithreading, especially on modern multi-core platforms, thread-safe methods and programs may be deemed to have higher quality than non-thread-safe methods and programs. Almost all the major programming languages provide thread synchronization primitives that can be used to suppress thread interference when multiple threads must share data objects in the memory. However, if not careful it can be easy for a programmer to make mistakes that will produce erroneous results.

Ensuring sufficient synchronization may become more difficult when a programmer depends on a third-party API. Ideally, when a function is made thread-safe by the use of the synchronization and other such primitives provided by a language, that fact should be declared in the API of the module. Conversely, when a function is not inherently thread-safe and the client programmer of the module should make sure that the function is invoked in a thread-safe manner in the client programmer's own code, that should also be declared in the API. Unfortunately, it is not uncommon to see APIs that offer no clues regarding the thread-safety of the methods. This is generally either because the providers of the API did not anticipate the use of the library in a multithreaded scenario or because they were just not being careful enough. Nonetheless, the result is that clients of the API have to resort to extensive testing to make sure that the provided functionality can be implemented in multithreaded manner.

In some embodiments, step 130 of process flow 100 may include determining an API Thread Safety Index ("ATSI") metric. The ATSI may measure the extent to which the method declarations of an API satisfy potential clients' needs regarding the presence and/or absence of thread safety statements.

Although Java annotations are recommended for documenting thread-safety and synchronization policies for API method declarations, unfortunately such annotations are not processed by Javadoc and hence are not visible to users who do not have access to the source code. Therefore, embodiments may make a reasonable assumption that if an API method declaration contains the words "thread" and "safe" then, in all likelihood, the method declaration explicitly conveys to the programmer the needed information on the thread safety of the method.

Embodiments may determine the ATSI by letting T be the set of method declarations in the API that contain the strings "thread" and "safe". As before, M may be the set of all method declarations in the API. The API thread safety thus may be determined according to the equation:

$$ATSI = \frac{|T|}{|M|}$$

Obviously, even a declaration that mentions that a method is "unsafe" for multithreading or "not" thread-safe will meet the requirement even though the declaration likely indicates that the method is not thread-safe. Similarly, a declaration containing strings such as "multithread ready" may indicate that a method is thread-safe but not meet the requirement. Thus, alternative embodiments may include lookup tables, fuzzy logic, natural-language analysis or other mechanisms to determine to a greater degree whether a method declaration indicates the thread-safety of a method.

Instead of throwing exception classes that are specific to the data type that generated the run-time fault, developers sometimes throw exceptions that are general. This mistake or shortcut is commonly made by the developers during software development because it requires less work. Throwing exception classes specific to each data type will, in general, require that new exception classes be defined by extending the system supplied exception classes.

Object-oriented exception-handling frameworks typically define a hierarchy of exception classes, each class in the hierarchy tailored to a specific type of error. Consider, for example, a hierarchy of input/output ("IO") classes in some object-oriented language. One may define a general IOException class for catching all anticipated runtime IO errors, such as missing files, incorrect data in files, etc., but then one may also define more specific exception classes such as FileIOException, SocketIOException, TerminalIOException, etc., all descendents of the parent IOException class but each geared to catching errors in a specific IO mode. Since object-oriented exception handling systems exhibit polymorphism, an exception of type, for example, FileIOException may be caught by a catch block whose parameter is of the more general type IOException, but not the other way around. Thus, exception handling works best if the thrown exception is specific to the context at hand, rather than a more general version. So, if file IO is the context and an exception needs to be thrown, it should be of type FileIOException, and not its more general parent IOException, although, on account of polymorphism, it would be legal to throw and catch the more general exception.

When a developer uses the system-supplied general exception classes for throwing exception objects when run-time faults occur during the execution of API methods, those exception classes become a part of the API documentation. Subsequently, the clients of the API document have to live with the resulting inefficiencies in tracing run-time faults.

In some embodiments, step 130 of process flow 100 may include determining an API Exception Specificity Index ("AESI") metric. The AESI may measure the extent of the generality and/or specificity of the method declarations of the API.

In embodiments, E(m) may be a function that returns the set of exceptions thrown by a given method m in the API. The inheritance hierarchy of the exception classes may be represented by a tree T=(N, V) where N is the set of exception classes represented as nodes and V is the set of edges which represent the inheritance relation between the exception classes. Henceforth, for lucidity, the terms 'exception class' and 'node' may be used synonymously.

For an exception e, D(e) may be the depth of the node e in the tree T. H(e) may be the height of the node e in the tree T. AESI(e) may denote the specificity of a given exception e according to the formula:

$$AESI(e) = \frac{(D(e))}{(D(e) + H(e))}$$

AESI(e) may be directly proportional to the "distance" of the exception class from the root and, at the same time, inversely proportional to its height from the leaf nodes in the exception class hierarchy. Therefore, an exception class at the bottom of the class hierarchy (i.e, the most specific exception class that could be used) may have a height of zero, which would cause AESI(e) to become one. By the same token, for an exception class that is more general and situated near the root of the hierarchy, the AESI(e) value may tend towards zero. If the exception class is at the root, its depth is zero; in this case the value of AESI(e) may equal zero. Thus, the value of AESI(e) may be bound between zero and one, with one denoting the most specific exception class and zero denoting the most generic exception class.

For a given method m, the API exception specificity index AESI(m) may be given by the average API exception specificity index AESI(e) for all the exceptions thrown by the method.

$$AESI(m) = \begin{cases} \dfrac{\sum_{\forall e \in E(m)} AESI(e)}{|E(m)|} \\ -1 \text{ when } E(m) = \phi \end{cases}$$

The value returned by the above expression is bounded by zero and one. If a majority of the exceptions thrown by the API methods are specific, the value of the metric tends toward one. Conversely, if a major proportion of the exceptions thrown are generic, the value of the metric tends toward zero.

The AESI for a given API may be the arithmetic mean of the AESI values for all the method declarations in the API that are described as throwing exceptions. M may denote the set of all method declarations in the API. The API level AESI thus may be defined by:

$$AESI = \frac{\sum_{\forall m \in M | AESI(m) \neq 1} AESI(m)}{|\{m \in M(i) \mid AESI(m) \neq -1\}|}$$

As with the other metrics, AESI may be bounded between zero and one, with a value of one when all the applicable method declarations in the API throw the most specific exception classes and zero when all the applicable method declarations throw the root exception class.

Even when the API method declarations, in and of themselves, do not suffer from the structural shortcomings listed above, the rest of the documentation associated with the API, if of substandard quality, could still make it challenging for a client to use the API effectively. For a well designed API, the documentation will present information related to any constraints that must be satisfied before a method can be invoked, any side effects associated with the method invocations, any default values associated with the parameters, and the like.

In some embodiments, step 130 of process flow 100 may include determining an API Documentation Index ("ADI") metric. Almost all major programming languages now provide support for embedding documentation in the source code through a system of tags inside specially designated comment blocks to indicate which source-code elements are being documented. For instance, Javadoc provides tags, such as returns, for documenting a method. If the source-code is available, embodiments may use these tags to measure the quality of API documentation. Alternatively, some embodiments may omit such a feature, instead having the goal to discern issues directly from the API documentation, without examining the source code.

With regard to documentation, as a general rule, the longer the documentation associated with a source code file, the more useful the documentation. While the precise content of documentation may be much more important than its length, a metric for the quality of documentation based on length may still provide a useful estimate of the quality of API documentation. $L_d(m)$ may be the length of the documentation in number of words for a given method m. The comment block, including any specially-designated comment blocks for various documentation generators, documentation just before a method header or just after will be considered to be the documentation associated with that method. ADI(m) may be used to denote the ADI for a given method m. It may be defined by the following formula:

$$ADI(m) = \begin{cases} 1 & \text{if } L_d(m) > \Psi \\ \dfrac{L_d(m)}{\Psi} & \text{otherwise} \end{cases}$$

where $\Psi$ is a threshold (e.g., a user specified threshold) for the length of minimum acceptable method-related documentation. Note that when a method does not have any associated documentation, the numerator becomes zero and the value of ADI(m) also becomes zero. Conversely, if the documentation for a method is present and its length is equal to or greater than our threshold $\Psi$ then the value of ADI(m) will be one. The ADI(i) for a given API i may be given by the equation:

$$ADI(i) = \frac{\sum_{\forall m \in M(i)} ADI(m)}{|M(i)|}$$

ADI(i) is also bounded between zero and one as it is a simple average of ADI(m) that is normalized across the methods of the API.

As motioned above, in addition to the length of an API's documentation, the content of the documentation may greatly bear the quality of the API. Alternative embodiment may utilize natural language processing and may analyze the API's documentation for its semantic content.

Figure 2:
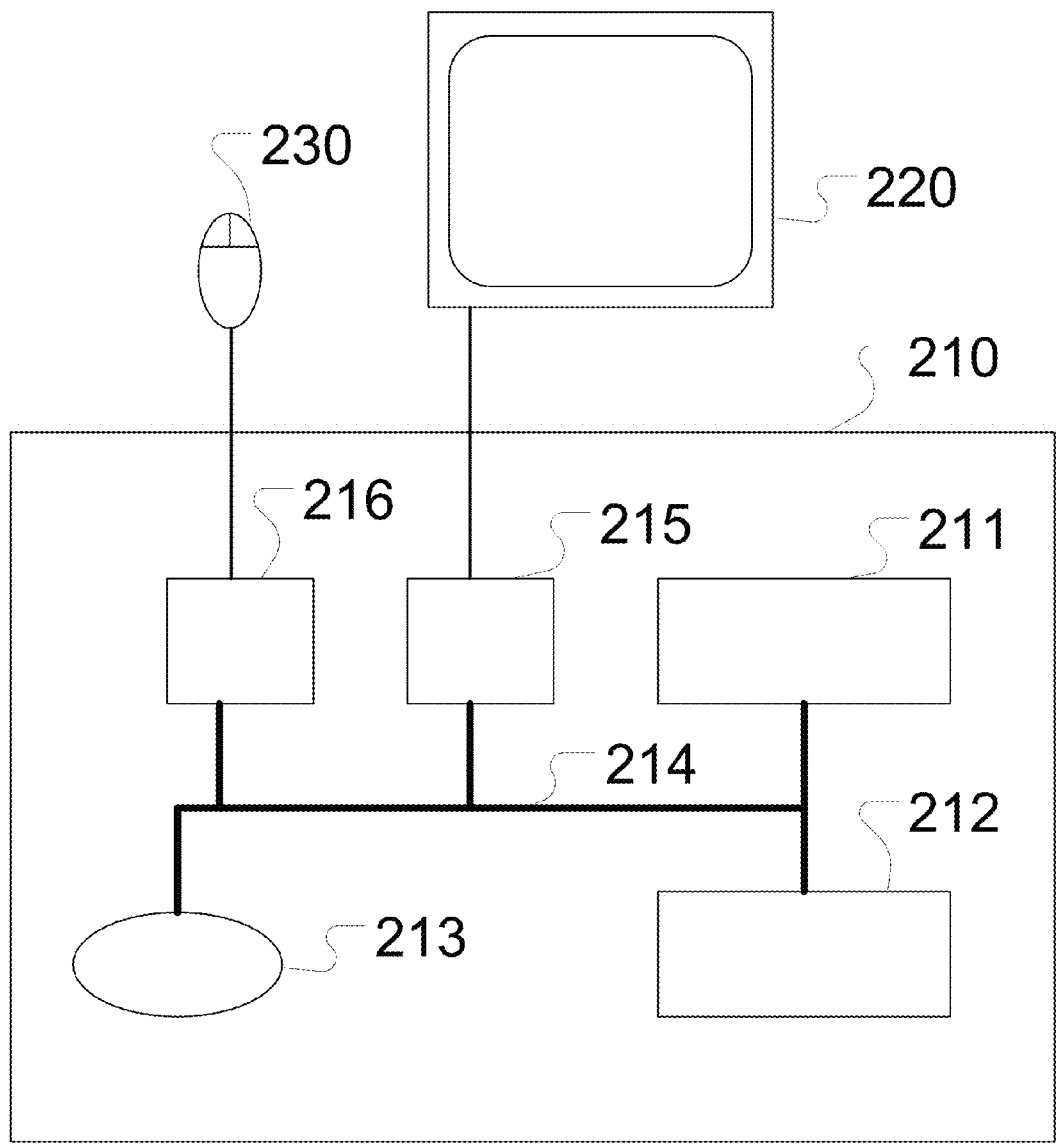
FIG. 2 shows an exemplary computing device useful for performing processes disclosed herein.

These embodiments may be implemented with software, for example modules executed on computing devices such as computing device 210 of FIG. 2. Of course, modules described herein illustrate various functionalities and do not limit the structure of any embodiments. Rather the functionality of various modules may be divided differently and performed by more or fewer modules according to various design considerations.

Computing device 210 has one or more processing device 211 designed to process instructions, for example computer readable instructions (i.e., code) stored on a storage device 213. By processing instructions, processing device 211 may perform the steps and functions disclosed herein. Storage device 213 may be any type of storage device (e.g., an optical storage device, a magnetic storage device, a solid state storage device, etc.), for example a non-transitory storage device. Alternatively, instructions may be stored in one or more remote storage devices, for example storage devices accessed over a network or the internet. Computing device 210 additionally may have memory 212, an input controller 216, and an output controller 215. A bus 214 may operatively couple components of computing device 210, including processor 211, memory 212, storage device 213, input controller 216, output controller 215, and any other devices (e.g., network controllers, sound controllers, etc.). Output controller 215 may be operatively coupled (e.g., via a wired or wireless connection) to a display device 220 (e.g., a monitor, television, mobile device screen, touch-display, etc.) in such a fashion that output controller 215 can transform the display on display device 220 (e.g., in response to modules executed). Input controller 216 may be operatively coupled (e.g., via a wired or wireless connection) to input device 230 (e.g., mouse, keyboard, touch-pad, scroll-ball, touch-display, etc.) in such a fashion that input can be received from a user.

Of course, FIG. 2 illustrates computing device 210, display device 220, and input device 230 as separate devices for ease of identification only. Computing device 210, display device 220, and input device 230 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 210 may be one or more servers, for example a farm of networked servers, a clustered server environment, or a cloud network of computing devices.

The following presents experimental validation of the exemplary metrics and indexes according to the disclosure herein. Of course, alternative embodiments may deviate from those validated herein while remaining within the scope of this disclosure. The following validation of the API usability metrics is based on measuring and analyzing the metrics on the following seven software systems: (1) Java Platform™ JDK 2 (to be referred to as Java 2™ henceforth); (2) Java Platform JDK™ 5 (to be referred to as Java 5 henceforth); (3) Eclipse Java Developer Toolkit™ (JDT), a popular IDE for Java (to be referred to as Eclipse henceforth); (4) Petstore, a reference J2EE implementation; (5) Hibernate, a software system for creating object-oriented interfaces for relational databases; (6) Compiere, a system for enterprise resource planning and customer relationship management; and, finally, (7) a large legacy proprietary financial software system (to be referred to as 'Financial' henceforth).

Except for the last, these are all freely-available software libraries. For the experiments, all public methods of all public classes are considered as API methods. For the case of Java 2™ and Java 5™, only those packages that appear in the online API documentation provided at the java.sun.com website were considered. All the deprecated methods from the API were excluded in the analysis. For the case of Eclipse JDT, all the internal packages (that is, package names containing the string internal) were excluded from the analysis.

Validation consists of comparing, for each software system listed above, the metric values measured for the APIs of the system with a quantitative assessment the general state of the APIs from the standpoint of the property that the metric is supposed to measure. So if it can be shown that a particular metric increases or decreases in roughly the same manner as the API property that the metric is supposed to capture, that would indicate that the metric is indeed behaving as it should. What lends a measure of statistical validity of such comparisons is the fact that the metric for each software system will actually be the average of the metric values obtained for hundreds and sometimes thousands of the class APIs in each system. To explain this with an analogy, to test the predictive power of a function which can predict the score that the students in a class may be expected to achieve in an examination, one may compare the prediction not against the actual score of the first student come across, but against the average over all the students in the class.

The validation obtained as explained above will be further bolstered, whenever possible, by comparing the computed metric values with the general beliefs held by the developer community regarding the software systems. However, one would only be able to do so when such beliefs are available either directly or can be inferred from the circumstances related to the development of a software system. When available directly, these general beliefs may be obtained from the commentaries in various forums and newsgroups devoted to the software systems.

Figure 3:
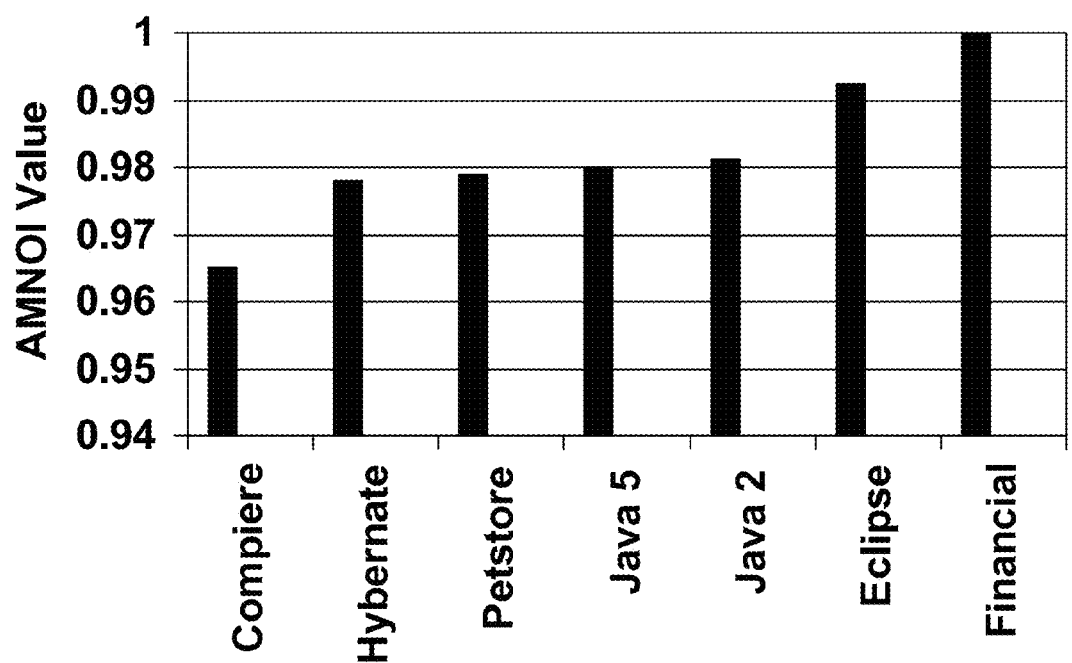
FIG. 3 shows experimental results of exemplary average method name overload index metric values for class APIs in plural software systems.

FIG. 3 shows experimental results of an exemplary average AMNOI metric values for the class APIs in the seven software systems. For measuring this metric, the overloading of the constructors was ignored since, by definition, in the signatures of the constructors the return types are always declared as void. In support of the metric values displayed in FIG. 3, the larger the number of bad groups and the larger the number of return types in each bad group, the more severe the occurrence of the structural issue in the APIs of a software systems. This is indeed borne out by the metric values shown in FIG. 3. The values shown in FIG. 3 are obtained by averaging the metric values over all the APIs.

Looking at the software systems, the API of the class javax.naming.directory.Attribute in Java 5™ yields a low value of 0.333 for the AMNOI metric. An examination of this API class shows that it has three groups of overloaded methods, of which two are inappropriate. The fact that two out of three method groupings are unacceptable from the standpoint of overloading is confirmed by the metric value of 0.333 for this API. The three groups of overloaded methods in this API are:

Overloaded Methods Group 1:
    void add(int ix, Object attrVal)
    boolean add(Object at attrVal)
Overloaded Methods Group 2:
    boolean remove(Object attrval)
    Object remove(int ix)
Overloaded Methods Group 3:
    Object get ( )
    Object get(int ix)

In Group 1, the method add( ) assumes an ordered list of attribute values; this method inserts the attribute value supplied through the second argument at the location specified by the first argument. On the other hand, the second method in Group 1 is based on the assumption that the attribute values are unordered and it appends the attribute value supplied through the only argument at the end of the attribute list. Whereas the first add( ) in Group 1 returns void, the second returns a boolean value. It may be an error to overload the method name add( ) in this manner. Thus, the quality of the API may have increased if the developers had defined two separate methods named according to their functionality. The former could, for example, have been named insert and latter append. The two methods listed under Group 2 above have a similar problem. The first remove( ) returns a boolean whereas the second method of the same name returns an Object.

Figure 4:
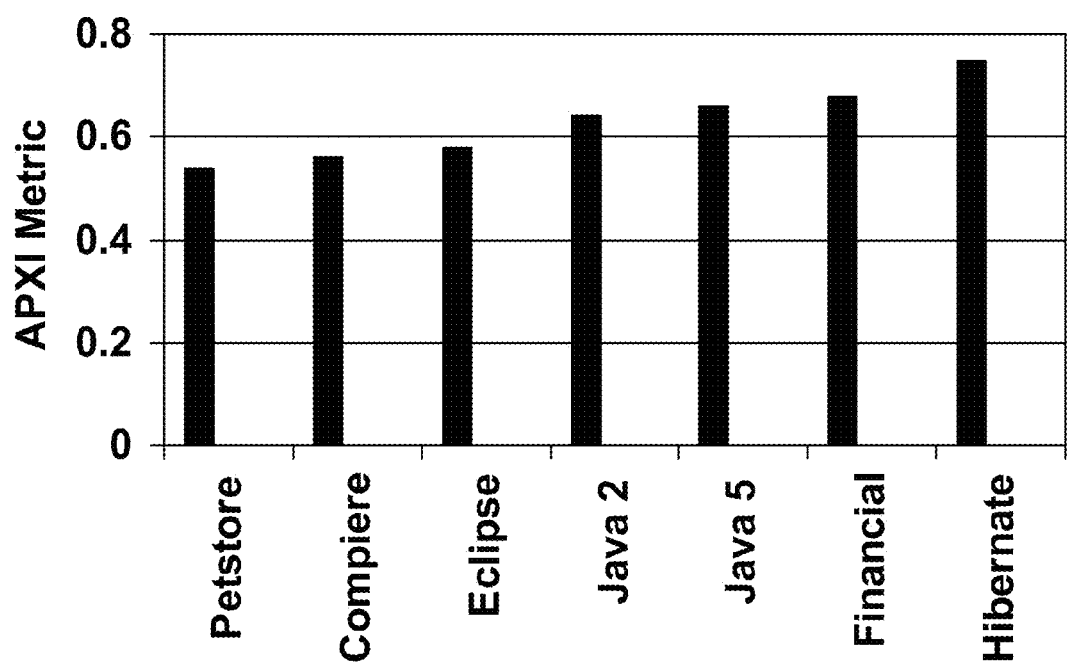
FIG. 4 shows experimental results reflecting exemplary average parameter list complexity metric values for the class APIs in plural software systems.
Figure 5:
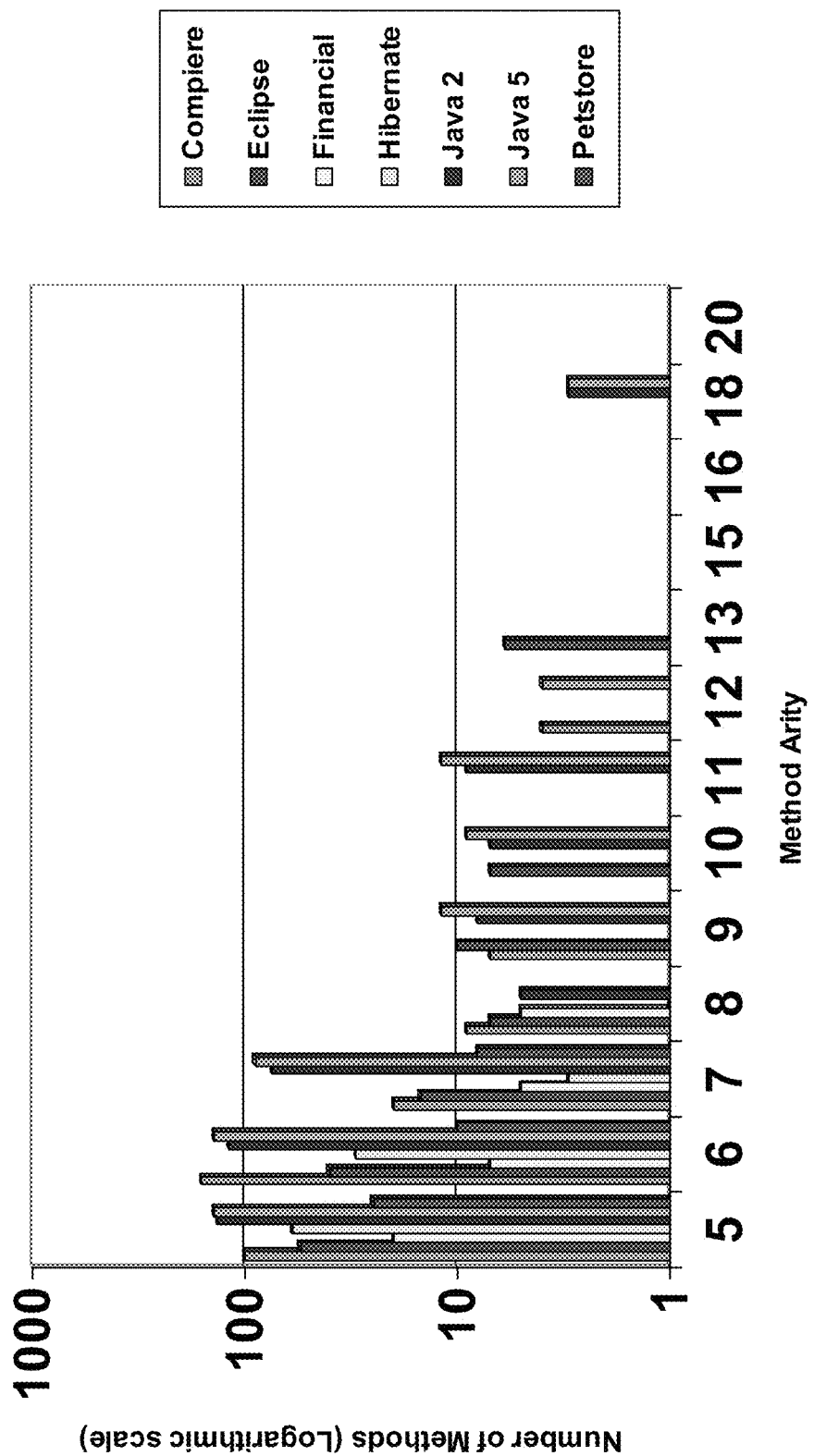
FIG. 5 shows exemplary experimental data supporting the values shown in FIG. 4.

For APXI related experiments, value of the parameter $N_d$ may set to four. Thus an API method potentially suffers from a structural issue when the number of parameters is greater than four. FIG. 4 shows experimental results reflecting exemplary average parameter list complexity metric values for the class APIs for all seven software systems. These metric values are supported by the exemplary experimental data presented in FIG. 5. That figure displays a distribution showing the number of methods for the different parameter lengths in each software system. As mentioned above, with the value of $N_d$ set to four for the APXI metric only those methods whose parameter lengths are greater than four were considered. From FIG. 4, it is clear that Petstore has the lowest APXI value. This is because Petstore, despite its being a relatively small system, has a disproportionately large number of methods with parameter lengths exceeding four, as is evident in FIG. 5. On the other hand, Hibernate has a somewhat better APXI value of 0.76. All of the API methods in Hibernate have parameter lengths of seven or less. As shown in FIG. 3, two Java libraries in Java 2™ and Java 5™ each have two API methods with eighteen parameters.

For an example of an API that suffers from the structural issues relating to parameter lists containing runs of the same type and long parameter lists that are difficult to remember, consider the class com.sun.j2ee.blueprints.catalog.model.Item in Petstore. This API has a low APXI value of 0.041728. The constructor of this API class has the following signature:

void Item(String category, String productId, String productName, String itemId, String imageLocation, String description, String attribute1, String attribute 2, String attribute3, String attribute4, String attribute5, double listPrice, double unitCost)

As explained above, the APXI metric may have two parts, one being a measure of the appropriateness of the parameter length and the other the extent of the variability in the parameter types. The measure related to parameter length for the Item constructor works out to 0.0001 since it has thirteen parameters. The other measure for the same method works out to 0.0833 since eleven out of twelve parameter types are the same. When the two contributions are averaged for the Item method, the APXI metric value for this API is 0.041728, which is the value that was actually measured for this particular API.

Figure 6:
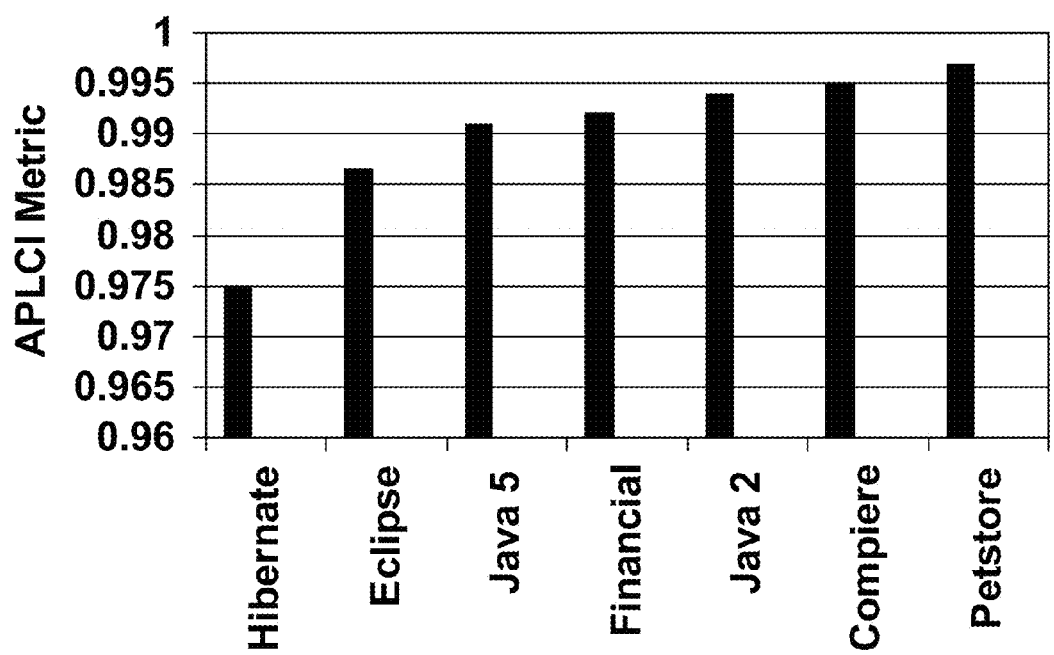
FIG. 6 shows experimental values obtained for the list consistency index metric for the APIs of the different software systems

FIG. 6 shows exemplary experimental values obtained for the list consistency index metric for the APIs of the software systems. The values shown are the averages over the class APIs in the respective software systems. Recall that a group may be considered inconsistent if the sequencing of the parameters is inconsistent across the methods in the group.

FIG. 6 shows that all of the systems have reasonably good values for this metric. That is because the number of API methods suffering from this structural issue is small compared to the total number of methods in the system. For instance, four out of the seven systems possess between six to ten inconsistent method groups out several hundred groups in each case. The Java libraries Java 2™ and Java 5™ have thirty-five and forty-five inconsistent groups respectively, but again from amongst thousands of such groups. Note that the fact that all of the software systems in our evaluation study do well with this metric does not diminish the importance of the metric, since, in practice, one is likely to apply this metric to an evolving body of software to assess the quality of its APIs. Additionally, if it is assumed that software flaws, including API flaws, and the frequency of usage of an API follow the power law distribution, even an API shortcoming that is likely to occur with low probability may cause major problems for a software system if that API is used sufficiently frequently.

To illustrate the behavior of this metric, any of the APIs in the software systems could be selected for the validation study. For example, the API of the class org.compiere.model.MPrivateAccess in Compiere is examined in this case, for which the computed value for APLCI is zero. This indicates that this API is particularly poor with regard to the structural issue of consistent sequencing of parameter types. A manual examination of this class API reveals that it has four method declarations that are declared as follows:
MPrivateAccess get(Properties ctx, int AD_User_ID, int AD_Table_ID, int Record_ID) Void MPrivateAccess (Properties ctx, int AD_User_ID, int AD_Table_ID, int Record_ID) String getLockedRecordWhere (int AD_Table_ID, int AD_User_ID) Void MPrivateAccess (Properties ctx, ResultSet rs)
Of these four method declarations, the first three share a pair of common parameter names, AD_User_ID and AD_Table_ID. Note that even though the first two method declarations share the parameter names AD_Table_ID and Record_ID, they do not form a valid set for the measurement of this metric since the cardinality of such a set would be less than three. However, the set of the first three method declarations is inconsistent since the order of the parameters AD_User_ID and AD_Table_ID are not preserved across all the methods in the set. So it is expected that the APLCI value for this API to be zero and that fact is borne out by actual measurement.

Figure 7:
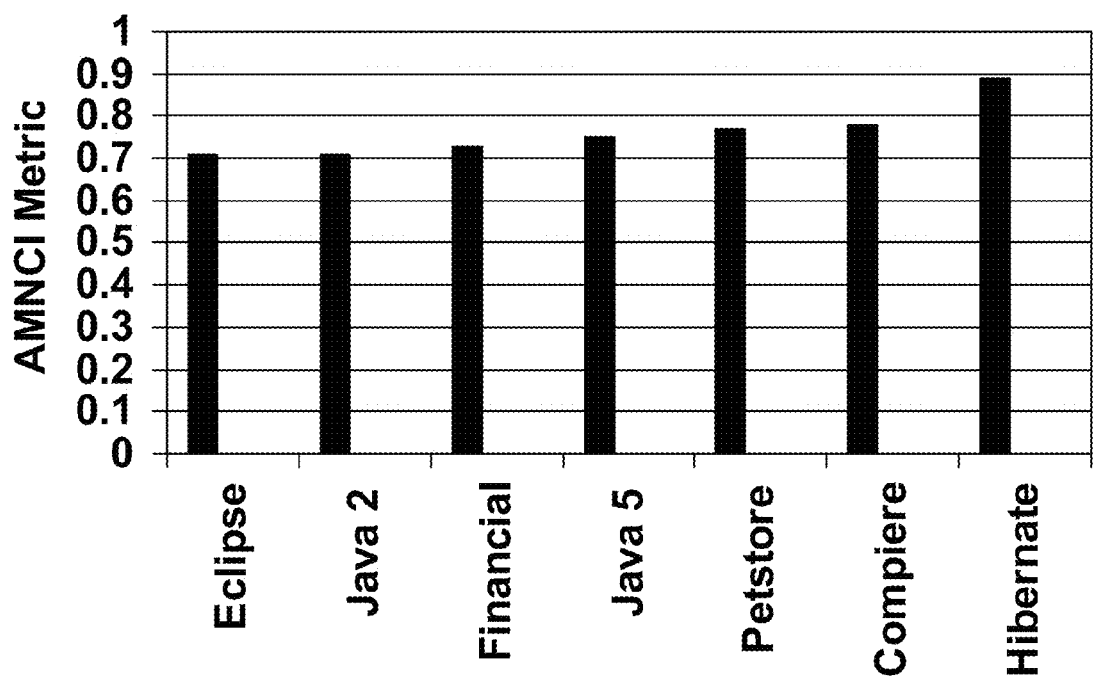
FIG. 7 shows the experimental values obtained for the method name confusion index metric for the different software systems.

FIG. 7 shows the exemplary experimental values obtained for the method name confusion index metric for the different software systems. The values shown are the averages over all the class APIs in each of the systems. Recall from the above discussion that methods are confusing if the method names are very nearly identical and fall under one of the method name abuse patterns discussed earlier. This is indeed borne out by the metric values shown in FIG. 7. As shown in FIG. 7, Hibernate, which has only two confusing API methods, has the highest AMNCI value. On the other hand, Eclipse and Financial that have 150 and 632 confusing API methods respectively have lower AMNCI values. Note that the counts are for all the class APIs in the software libraries. On the other hand, the AMNCI metric values shown in the figure are first computed for each class API separately and then averaged over all the classes in a system. That should explain the discrepancy between the ordering of the systems on the basis of the metric values as shown in the figure and the ordering on the basis of the total number of confusing API methods.

It is interesting to note that all the software systems in the validation study have good values for this metric. This is to be expected as the method name confusion of the type addressed by the structural issue related to existence of too many methods with nearly identical names is usually introduced when a software package is changed to meet the evolving needs of its customers. Most of the open source systems considered, such as Petstore and Hibernate, have not undergone significant API changes since they were first introduced. So it is not surprising that, Petstore has only 12 method names (spread over 3 class APIs). By the same token, Java 2™ has 84 confusing method names and Java 5™ has 90. On the other hand, the proprietary financial system that has been constantly evolving to meet the varying business needs of the customers has 632 confusing API methods.

To consider a specific API to further illustrate the behavior of this metric, the API for class javax.swing.event.ListDataEvent in Java 5™ is examined. The AMNCI metric value for this API is 0.6. A manual examination of this API reveals that it consists of five method declarations, of which two declarations with method names getIndex0( ) and getIndex1( ) are confusing in the sense captured that too many methods with nearly identical names exist. The documentation associated with this API mentions that the method getIndex0( ) is supposed to return the lower index of a range and the method getIndex1( ) the upper index. There is no way a user of the API can realize this by just looking at the names of the two methods. The user is forced to also look at the additional API documentation to resolve the confusion. Since two method declarations out of five are confusing, it is not surprising that the AMNCI value calculates out to be 0.6. Let's next consider the API for the class org.apache.xalan.trace.PrintTraceListener in Java 5™. The metric calculation for this API returned an AMNCI value of 0.7141. A manual examination of the API shows that two out of seven method declarations, these being_trace( ) and trace( ) are confusing in the sense that they have nearly identical names. That is indeed a confirmation for the calculated value of 0.7141 for the metric.

Figure 8:
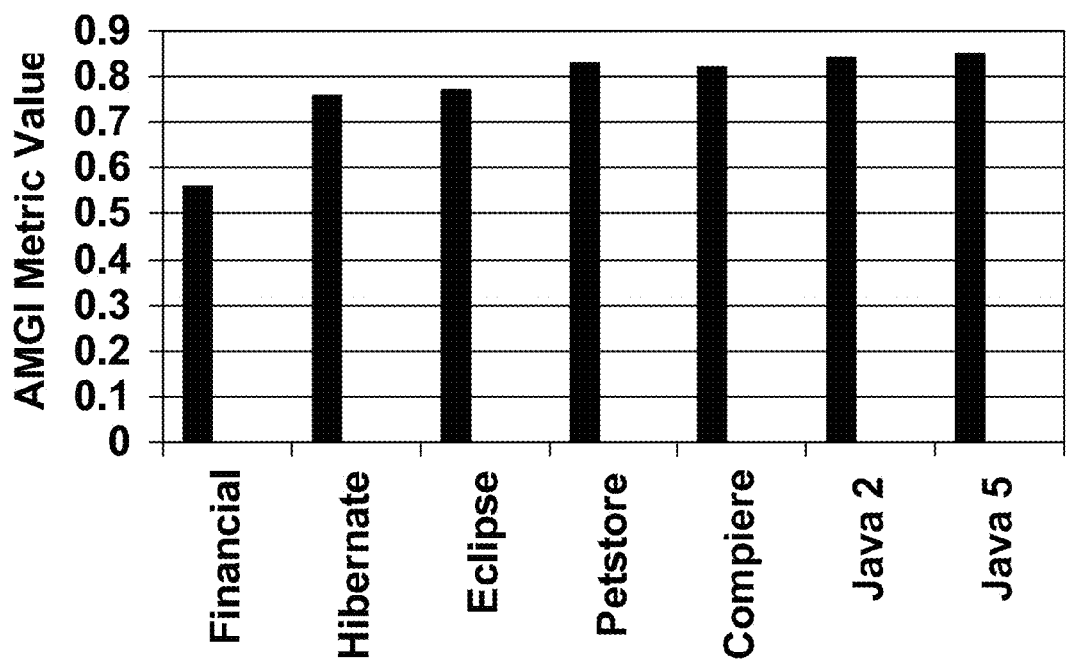
FIG. 8 shows the experimental values obtained for the method grouping index metric values for the different software systems.

The method grouping index metric values for the APIs of the different software systems are shown in FIG. 8. The AMGI value for the financial system is a relatively low value of 0.6749. This can be explained by the fact that this legacy system has evolved haphazardly over a span of 10 years. As various methods were added to this software library, not much attention was given to how the various related methods were grouped together in the API. Therefore the circumstances of the evolution of this software should lead one to expect a low value for a metric such as AMGI, which indeed turns out to be the case.

The API for the class org.compiere.util.ZipUtil in the Compiere library has a low AMGI value of 0.3958. A manual examination of this API reveals that its important keywords are zip, jar, manifest, and entry and we must determine the AMGI contribution made by each. For the keyword manifest, none of the related methods getManifest( ), getManifest (String filename), and dumpManifest( ) are grouped together. As a consequence, the keyword manifest should contribute zero to the metric. For the keyword entry, two of the methods whose names contain the keyword, getEntry( ) and getEntryInfo( ) are consecutive, but the other three, getEntry( ) getJarEntry( ) and getEntryTime( ) are at three different locations in the API. As a result, the keyword entry contributes a value of 0.25 to the metric. Similar manual examination of the method declarations that contain the keyword jar reveals that it should make a contribution of 0.33 to the metric. Finally, the keyword zip can be seen to show up in a consecutive sequence of three methods, indicating that it should contribute one to the metric. Averaging all of these expected values gives 0.3958, which is the value actually computed for the metric.

Two special circumstances pertain to the validation of the thread safety index metric. First, vis-à-vis the validations we have presented so far, a slightly different "protocol" for the validation of ATSI is used since not all seven software systems support multithreading. Validation for this metric will be based on a comparison of Java 2™ with Java 5™. Second, for the calculation of ATSI, all the API methods are considered to have been documented for thread safety if such documentation exists at the class level. This was made necessary by the fact that developers sometimes lump together the thread-safety statements for all the method declarations and place them at the head of the API document.

In order to appreciate the values of this metric for the two Java platforms, note the widely-held belief in the Java developer community that the Java 2™ APIs were found by the developers to be seriously wanting with regard to thread-safety declarations. This was especially true of the Swing classes. Many of the class methods of the Swing library are not meant to be invoked concurrently by multiple threads in a multithreaded GUI program. For illustration, a multithreaded access to the TextArea GUI widget could cause one thread to write new information in the TextArea window while the other thread was in the middle of clearing up the old content of the window. This could lead to the visible information in the GUI to be partially old and partially new. To forestall such consequences of concurrency, the invocation of thread-unsafe class methods was meant to be regulated by their placement in the special Event Dispatch Thread.

But the Java 2™ platform often failed to inform the users of the API as to which methods were thread-safe and which are not. The resulting frustrations experienced by the programmers of the Java 2™ libraries, especially the programmers using the Swing packages, are well documented in the numerous posts at the Java Developers Forum. Comparatively speaking, the APIs of the same libraries in Java 5™ are much better documented with regard to the thread safety issue. Wherever applicable, Java 5™ mentions explicitly that Swing was not designed with multithreaded applications in mind and its use in such scenarios is discouraged.

Figure 9:
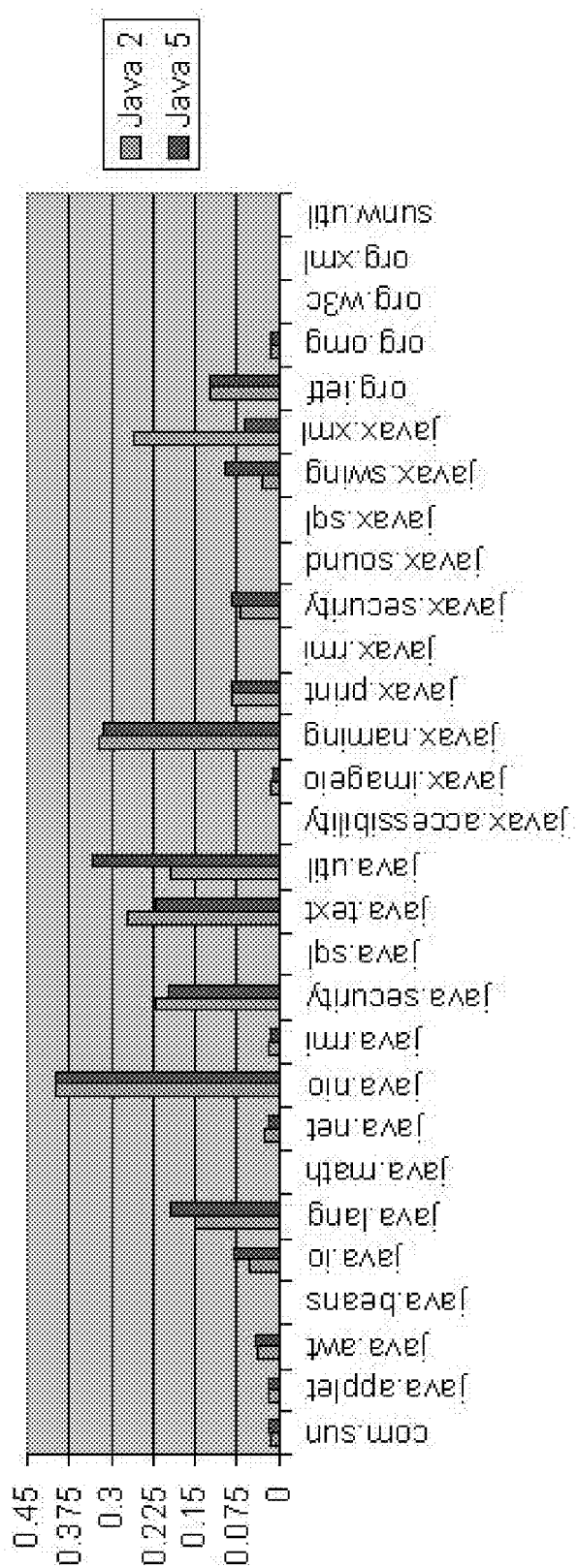
FIG. 9 shows experimental values obtained for the thread safety index metric for the different packages in Java 2™ and in Java 5™.

One should expect the ATSI metric to produce a relatively low value for the Java 2™ Swing package and high value for the same package in Java 5™. FIG. 9 shows a comparison of the ATSI metric values for the different packages in Java 2™ and in Java 5™. As shown, the metric indeed produces a higher metric value of 0.094 for the Java 5™ Swing package and a lower value of 0.030 for the Java 2™ Swing package. This is in accordance with expectations.

The ATSI value being higher for Java 5™ Swing package does speak to the metric behaving as it should. However, the fact that the ATSI value for this package is as low as 0.094 may give pause. This metric is nonetheless useful, because a manual examination of the Java 5™ Swing package reveals too many methods for which no thread-safety declarations have been made. As a case in point, consider the API for the class XMLEncoder. The various postings in the Java Developers Forum clearly indicate that the various methods listed in this API are not thread-safe. However, there is no mention of this fact in the API itself or in the documentation associated with the API. Even though the ATSI metric values for Java 5™ are better than those for Java 2™, there is still considerable room for improvement in the former with regard to the adequacy of thread-safety documentation for the various methods declared in the APIs.

Figure 10:
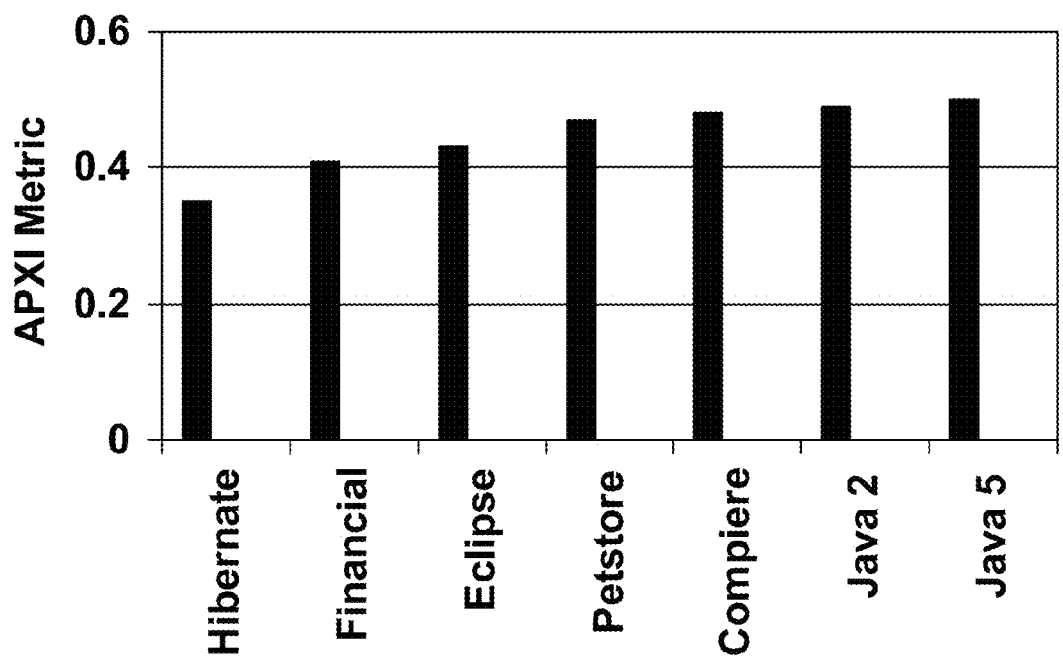
FIG. 10 shows experimental average values for the exception specificity index metric for the APIs of the different software systems.

FIG. 10 shows experimental average values for the exception specificity index metric for the APIs of all seven software systems. Since all of these systems are Java systems, the specificity of the exceptions thrown are with respect to the root class in the exception hierarchy. Application specific exceptions have been ignored. The analytics with regard using exception throwing glasses that are too general with respect to the error conditions that result in exceptions for the different software systems are shown. The most severe form of the structural issue occurs when the thrown exception is the root class Exception. One could argue that, in a large number of cases when the root class itself was for exception throwing, the programmers had simply succumbed to the convenience of using the language-supplied class Exception for all sorts of programming contexts. Note that there are 162 API methods in Hibernate that throw the exception class Exception. In the case of the Financial application, there are 35 API methods that appear to have resorted to this convenience. Using a language-supplied exception class is frequently the case when software is first prototyped since it does take effort to create new exception classes for different programming scenarios. Obviously, the same thing can happen when a software system grows without adequate attention to quality and maintainability.

To take up a specific API for further illustrating this metric, the API for the class java.lang.reflect.InvocationHandler in Java 5™ is examined. The calculated value of AESI for this API is zero. A manual examination of this API reveals that it has only one method declaration with the exception throwing clause. However, the exception class used in the clause happens to be Throwable, the base class of the exception hierarchy in Java. So one would expect this API to result in zero for the AESI metric, which is indeed the case.

Figure 11:
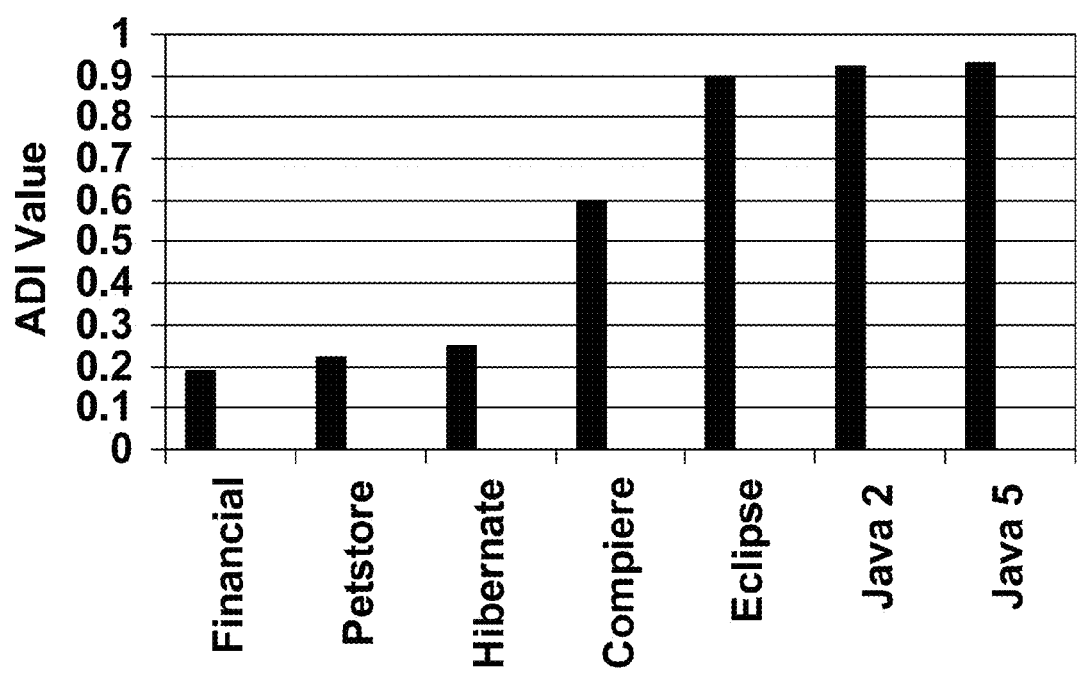
FIG. 11 shows experimental average values for the document index metric for the APIs of the different software systems.

FIG. 11 shows exemplary experimental average values for the document index metric for the APIs of the seven software systems. This shows the analytics for the software systems with regard to the structural issue of having insufficient documentation. The larger the number of APIs with insufficient documentation, the greater the severity of the occurrence of this structural issue. This is indeed borne out by the metric values shown in the figure. The Financial system has 212 API classes with zero documentation and has the lowest ADI metric value of 0.18. Likewise, Petstore which is a reference EJB implementation has a low ADI value. It would be reasonable to expect that the APIs of the software libraries that are meant to be used for creating new applications would be much better documented compared to the APIs of the software systems that are the applications themselves. Application software tends to stand on its own and programmers frequently do not find it sufficiently compelling to document its APIs adequately. As shown, the metric values for the APIs of the Java platform are the highest, lending credibility to the formulation of the metric.

The metric values shown in FIG. 11 bear out one more commonly-held belief in the developer community: the APIs for the open-source software packages that are used as building blocks in larger systems are generally better documented compared to the APIs of proprietary software or stand-alone software. Eclipse, a very popular open source software system, has a metric value of 0.9 for ADI. On the other hand, the APIs of the financial system yield a low ADI value of 0.18.

To focus on a specific API for a better understanding of the metric, consider the API for the class java.util.logging.StreamHandler in Java 5™. The ADI for this API has a reasonably high value of 0.88. However, given that it is not a perfect 1.0 points to the possibility that there might still be a residual documentation-related issue in this API. A manual examination reveals that this API has seven method declarations. These are for the methods setEncoding( ), publish( ), isLoggable( ), flush( ), close( ) and two constructors. Five of these seven method declarations have associated with them more than ten words of documentation related to the parameter usage and functionality. For instance, the documentation that accompanies the declaration of the method setEncoding( ) not only describes the parameter but also the possible values that can be passed. It also provides adequate documentation on the exceptions thrown. So we should expect these method declarations to make a large contribution to the ADI value for the API. Since ten words are considered as the minimal extent of documentation that should accompany a method declaration, all these five methods contribute a value of one to the overall ADI for the API. However, the declarations for the methods flush( ) and StreamHandler( ) carry reduced documentation, only four and eight words, respectively. These fall below our acceptance thresholds for the size desired for documentation. These two method declarations should contribute values of only 0.4 and 0.8, respectively, to the ADI. When all of the different contributions to the metric are averaged, a value of 0.88 should be expected, which is indeed the case.

The next analysis is determining the level of confidence that can be placed in the experimental validation of the metrics presented in the previous section. Addressing such a question usually comes under the "Threats to Validity" rubric in modern research literature. It is important to ensure that the various potential threats to the validity of the experiments used for supporting the metrics have been considered. These threats are usually investigated from the following three perspectives: the construct validity, the internal validity, and the external validity.

The construct validity questions involve whether an experiment is really measuring what it is supposed to measure. Construct validity in the experiments is taken care of by an actual examination of the APIs that yield values that are either too low or too high. For example, the APIs of the financial system yields a value of only 0.3597 for the AESI metric. This value has been verified by actually examining the APIs for the exception declarations of the methods in the APIs. The same is true for all of the other instances of such manual examinations listed in the previous section.

The internal validity questions the design of the experiment itself. With regard to this threat to validity, the presentation of just the average values for the metrics and the manual examination of the APIs for the low/high values of the metrics could be criticized as not being sufficiently sophisticated from the standpoint of modern statistical data analysis. With regard to the presentation of "deeper" statistical analysis of the metric values, there are two issues to consider: it would take the focus away from the conceptual construction of the metrics, and issues of space limitations.

As for the external validity, the question here is as to what extent the metrics can be generalized and used for API usability assessment for other object-oriented software systems considering that all the validation studies have been carried out on just the Java based systems. In response, note that, the metric formulations use only the method signatures in the API documents. Since the metrics do not need to examine the implementation code, the formulations are language independent. Therefore, there is strong confidence that the metrics would also apply to API specifications of the software systems in other languages.

This disclosure generally refers to "clients", "client programmers", "programmers", "designers", and other similar terms for those who use an API. These and similar terms are intended to be used interchangeably to refer to any person or entity that interacts with an API.

Embodiments have been disclosed herein. However, various modifications can be made without departing from the scope of the embodiments as defined by the appended claims and legal equivalents.

What is claimed is:

1. A computer-implemented method for determining the quality of an Application Programming Interface (API) by one or more computing devices, the method comprising:

receiving, by at least one of the one or more computing devices, documentation of the API;

determining, by at least one of the one or more computing devices, one or more characteristics of the API based at least in part on the documentation of the API, wherein the one or more characteristics include at least one of a name corresponding to at least one method in the API, one or more parameters corresponding to at least one method in the API, and a functionality of at least one method in the API;

determining, by at least one of the one or more computing devices, one or more measurement values based at least in part on the one or more characteristics of the API, wherein the one or more measurement values include at least one of a parameter list complexity of the API consistency of the parameters of the API, a level of confusion of the API, a logical method groupings of the API, a thread safety of the API, an exception notification of the API, and a documentation quality of the API; and determining, by at least one of the one or more computing devices, a quality score for the API based at least in part on the one or more measurement values.

2. The method of claim 1, wherein the step of determining one or more measurement values includes determining the extent to which one or more overloaded methods of the API do not return the same type.

3. The method of claim 2, wherein the step of determining one or more measurement values includes determining an API method name overload index by:

for each method having a distinct name in one or more distinctly named methods in the API:
determining a first value corresponding to the cardinality of a set of methods having the distinct name;
determining a second value corresponding to the cardinality of a set of methods having the distinct name and differing returns; and
generating an index for the distinct name comparing the first value and the second value;
summing one or more indexes corresponding to the one or more distinctly named methods to generate a sum; and
determining a ratio between the sum and a number of the one or more distinctly named methods.

4. The method of claim 1, wherein the parameter list complexity is based at least in part on at least one of a length of parameter lists having the same type of parameter and a length of parameter lists which exceed a predetermined threshold.

5. The method of claim 4, wherein the step of determining one or more measurement values includes determining an API list complexity index by:

determining a parameter length quality as a function of a desired parameter length value averaged over all methods in the API;
determining a parameter sequence complexity as a function of the extent to which the parameter types of the API do not stay the same for consecutive parameters of the same type averaged over all methods of the API; and
averaging the parameter length quality and parameter sequence complexity.

6. The method of claim 1, wherein the step of determining one or more measurement values includes determining a parameter list consistency index by:

determining a first set of all methods in the API containing two common parameters in any order;
partitioning the first set into two disjoint subsets including a first subset in which a first common parameter appears before a second common parameter and a second subset in which the second common parameter appears before the first common parameter;
determining that the first set is consistent if the cardinality of the set is at least two and one of the first subset and the second subset is empty; and
determining that the first set is inconsistent if the cardinality of the set is less than two and neither the first subset nor the second subset is empty.

7. The method of claim 1, wherein the step of determining one or more measurement values includes determining a method name confusion index by:

determining a set of method names in the API, the set configured to only include a single instance of a method name;
determining a canonical form of plural method names in the set of method names by applying one or more canonical form rules;
determining a set of confusing method names by identifying duplicate canonical form method names; and
determining a ratio of the cardinality of the set of confusing method names and the cardinality of the set of method names.

8. The method of claim 7, wherein the canonical form rules include one or more of:

removing one or more suffixes from the end of method names;
removing one or more special characters from the method names; and
converting a case of the method names.

9. The method of claim 1, wherein the step of determining one or more measurement values includes determining a thread safety index by:

determining a set of method declarations in the API that include one or more strings indicating that the declaration is thread-safe; and
determining a ratio of the cardinality of the set of method declarations that include one or more strings indicating that the declaration is thread-safe and a set of all method names in the API.

10. The method of claim 1, wherein the step of determining one or more measurement values includes determining an exception specificity index by:

determining, for one or more exceptions in the API, a depth of the exception and a height of the exception in a tree;
determining, for the one or more exceptions, an exception specificity based on the depth of the exception and the height of the exception;
determining, for one or more methods in the API, a method exception specificity index based on one or more exceptions of the method; and
determining, for the API, an exception specificity index based on the method specificity index of one or more methods in the API.

11. The method of claim 1, wherein the step of determining one or more measurement values includes determining a document index by:

determining, for each method declaration in the API, a method document index based on the length of documentation in the method declaration and a threshold value; and
determining the document index by averaging the method document indexes for plural methods in the API.

12. A system for determining the quality of an Application Program Interface (API), said system comprising:

one or more processors; and
one or more memories operatively coupled to at least one of the one or more processors and having instructions stored thereon that, when executed by at least one of the one or more processors, cause at least one of the one or more processors to:

receive documentation of the API;

determine one or more characteristics of the API based at least in part on the documentation of the API, wherein the one or more characteristics include at least one of a name corresponding to at least one method in the API, one or more parameters corresponding to at least one method in the API, and a functionality of at least one method in the API;

determine one or more measurement values based at least in part on the one or more characteristics of the API, wherein the one or more measurement values include at least one of a parameter list complexity of the API, a consistency of the parameters of the API, a level of confusion of the API, a logical method groupings of the API, a thread safety of the API, an exception notification of the API, and a documentation quality of the API; and determine a quality score for the API based at least in part on the one or more measurement values.

13. The system of claim 12, wherein the step of determining one or more measurement values includes determining an API method name overload index by:

for each method having a distinct name in one or more distinctly named methods in the API:
  determining a first value corresponding to the cardinality of a set of methods having the distinct name;
  determining a second value corresponding to the cardinality of a set of methods having the distinct name and differing returns; and
  generating an index for the distinct name comparing the first value and the second value;

summing one or more indexes corresponding to the one or more distinctly named methods to generate a sum; and determining a ratio between the sum and a number of the one or more distinctly named methods.

14. The system of claim 12, wherein the step of determining one or more measurement values includes determining an API list complexity index by:

determining a parameter length quality as a function of a desired parameter length value averaged over all methods in the API;

determining a parameter sequence complexity as a function of the extent to which the parameter types of the API do not stay the same for consecutive parameters of the same type averaged over all methods of the API; and averaging the parameter length quality and parameter sequence complexity.

15. The system of claim 12, wherein the step of determining one or more measurement values includes determining a parameter list consistency index by:

determining a first set of all methods in the API containing two common parameters in any order;

partitioning the first set into two disjoint subsets including a first subset in which a first common parameter appears before a second common parameter and a second subset in which the second common parameter appears before the first common parameter;

determining that the first set is consistent if the cardinality of the set is at least two and one of the first subset and the second subset is empty; and determining that the first set is inconsistent if the cardinality of the set is less than two and neither the first subset nor the second subset is empty.

16. The system of claim 12, wherein the step of determining one or more measurement values includes determining a method name confusion index by:

determining a set of method names in the API, the set configured to only include a single instance of a method name;

determining a canonical form of plural method names in the set of method names by applying one or more canonical form rules;

determining a set of confusing method names by identifying duplicate canonical form method names; and determining a ratio of the cardinality of the set of confusing method names and the cardinality of the set of method names.

17. At least one non-transitory computer-readable medium storing computer-readable instructions that, when executed by one or more computing devices, cause at least one of the one or more computing devices to:

receive documentation of an Application Program Interface (API);

determine one or more characteristics of the API based at least in part on the documentation of the API, wherein the one or more characteristics include at least one of a name corresponding to at least one method in the API, one or more parameters corresponding to at least one method in the API, and a functionality of at least one method in the API;

determine one or more measurement values based at least in part on the one or more characteristics of the API, wherein the one or more measurement values include at least one of a parameter list complexity of the API, a consistency of the parameters of the API, a level of confusion of the API, a logical method groupings of the API, a thread safety of the API, an exception notification of the API, and a documentation quality of the API; and determine a quality score for the API based at least in part on the one or more measurement values.

18. The computer-readable medium of claim 17, wherein the step of determining one or more measurement values includes determining an API method name overload index by:

for each method having a distinct name in one or more distinctly named methods in the API:
  determining a first value corresponding to the cardinality of a set of methods having the distinct name;
  determining a second value corresponding to the cardinality of a set of methods having the distinct name and differing returns; and
  generating an index for the distinct name comparing the first value and the second value;

summing one or more indexes corresponding to the one or more distinctly named methods to generate a sum; and determining a ratio between the sum and a number of the one or more distinctly named methods.

19. The computer-readable medium of claim 17, wherein the step of determining one or more measurement values includes determining an API list complexity index by:

determining a parameter length quality as a function of a desired parameter length value averaged over all methods in the API;

determining a parameter sequence complexity as a function of the extent to which the parameter types of the API do not stay the same for consecutive parameters of the same type averaged over all methods of the API; and averaging the parameter length quality and parameter sequence complexity.

20. The computer-readable medium of claim 17, wherein the step of determining one or more measurement values includes determining a parameter list consistency index by:
- determining a first set of all methods in the API containing two common parameters in any order;
- partitioning the first set into two disjoint subsets including a first subset in which a first common parameter appears before a second common parameter and a second subset in which the second common parameter appears before the first common parameter;
- determining that the first set is consistent if the cardinality of the set is at least two and one of the first subset and the second subset is empty; and
- determining that the first set is inconsistent if the cardinality of the set is less than two and neither the first subset nor the second subset is empty.

\* \* \* \* \*